US012698751B1

(12) United States Patent
Davis

(10) Patent No.: US 12,698,751 B1
(45) Date of Patent: Aug. 4, 2026

(54) FUEL PUMP

(71) Applicant: Joshua Loren Davis, Metamora, IL (US)

(72) Inventor: Joshua Loren Davis, Metamora, IL (US)

( * ) Notice: Subject to any disclaimer, the term of this patent is extended or adjusted under 35 U.S.C. 154(b) by 23 days.

(21) Appl. No.: 18/621,793

(22) Filed: Mar. 29, 2024

(51) Int. Cl.

| | |
|---|---|
| ***F02M 59/10*** | (2006.01) |
| ***F02M 59/06*** | (2006.01) |
| ***F02M 59/46*** | (2006.01) |
| ***F04B 1/0421*** | (2020.01) |
| ***F04B 1/053*** | (2020.01) |
| ***F04B 9/04*** | (2006.01) |
| ***F04B 17/05*** | (2006.01) |

(52) U.S. Cl.
CPC .......... *F02M 59/102* (2013.01); *F02M 59/06* (2013.01); *F02M 59/462* (2013.01); *F04B 1/0421* (2013.01); *F04B 1/053* (2013.01); *F04B 9/042* (2013.01); *F04B 17/05* (2013.01)

(58) Field of Classification Search
CPC .... F02M 59/06; F02M 59/102; F02M 59/462; F04B 1/0421; F04B 1/053; F04B 9/042; F04B 17/05
See application file for complete search history.

(56) References Cited

U.S. PATENT DOCUMENTS

2016/0108875 A1* 4/2016 Lamm .................. F02M 59/102
417/364

FOREIGN PATENT DOCUMENTS

| | | | | | |
|---|---|---|---|---|---|
| CN | 106150806 | B | * | 8/2020 | |
| DE | 2924768 | A1 | * | 1/1981 | |
| DE | 10229396 | A1 | * | 1/2004 | F02M 59/06 |
| DE | 10247142 | A1 | * | 4/2004 | F04B 1/0404 |
| DE | 102005007839 | B3 | * | 5/2006 | F02M 59/102 |
| DE | 4401074 | B4 | * | 1/2007 | F04B 49/022 |
| DE | 102009002679 | A1 | * | 11/2010 | F04B 1/0439 |
| DE | 102011076015 | A1 | * | 11/2012 | F02M 63/0001 |
| DE | 102011076018 | A1 | * | 11/2012 | F02M 59/06 |
| DE | 102012223161 | A1 | * | 7/2014 | F02M 59/462 |
| DE | 102016201645 | A1 | * | 8/2017 | F04B 53/14 |
| DE | 102016216849 | A1 | * | 3/2018 | F04B 9/042 |
| DE | 102016218844 | A1 | * | 3/2018 | F04B 1/0404 |
| DE | 102017205200 | A1 | * | 10/2018 | F04B 1/00 |
| DE | 102017212910 | A1 | * | 1/2019 | F04B 1/00 |
| DE | 102017214845 | A1 | * | 2/2019 | F04B 9/042 |
| DE | 102019212290 | A1 | * | 2/2021 | F04B 1/0421 |

(Continued)

*Primary Examiner* — Alexander B Comley
(74) *Attorney, Agent, or Firm* — CANTOR COLBURN LLP

(57) ABSTRACT

A fuel pump having a pump housing with a first lifter bore, a fuel inlet aperture, a fuel bypass aperture, and a crankcase chamber is provided. The pump includes a first roller lifter coupled to a first pumping plunger. The pump includes a camshaft having a drive cam disposed in the crankcase chamber. The camshaft rotates the drive cam to reciprocate the first roller lifter within the first lifter bore. The fuel inlet aperture extends through the pump housing to the crankcase chamber. A fuel bypass aperture communicates with the fuel inlet aperture. The fuel inlet aperture routes fuel to the fuel bypass aperture which has not traversed through the crank-case chamber after entering the fuel inlet aperture. The fuel bypass aperture supplies the fuel to a valve. The pump includes a first anti-rotation pin that prevents rotation of the first roller lifter.

9 Claims, 26 Drawing Sheets

(56) References Cited

FOREIGN PATENT DOCUMENTS

| | | | | | |
|---|---|---|---|---|---|
| JP | 4306159 | B2 | * | 7/2009 | |
| JP | 2013130144 | A | * | 7/2013 | |
| WO | WO-2006053792 | A1 | * | 5/2006 | .............. F04B 53/18 |
| WO | WO-2014118181 | A1 | * | 8/2014 | ......... F02M 63/0001 |
| WO | WO-2020122890 | A1 | * | 6/2020 | ............ F04B 49/065 |

* cited by examiner

FUEL PUMP

BACKGROUND

Fuel pumps internally route fuel through a crankcase chamber and then through an output port of a cylinder head. A problem associated with this fuel routing is that the crankcase chamber often has metal debris therein which is captured by the fuel moving through the crankcase chamber which is thereafter pumped out of the fuel pump. The metal debris in the fuel is received by downstream fuel injectors which can destroy the functionality of the fuel injectors.

Also, the fuel pumps utilize roller lifters driven by a drive cam. The roller lifters often undesirably rotate within the pump which can cause the roller lifters to damage the drive cam. As a result, the fuel pump with the damaged cam drive must be replaced.

The inventor herein has recognized a need for an improved fuel pump that minimizes and/or reduces the above-mentioned problem.

SUMMARY

A fuel pump in accordance with an exemplary embodiment is provided. The fuel pump includes a pump housing having a first lifter bore, a fuel inlet aperture, a fuel bypass aperture, and a crankcase chamber. The first lifter bore communicates with the crankcase chamber. The fuel pump further includes a first roller lifter that is disposed in the first lifter bore. The first roller lifter is operably coupled to a first pumping plunger. The fuel pump further includes a camshaft having a drive cam disposed in the crankcase chamber. The drive cam contacts the first roller lifter. The camshaft is rotatable by an exterior motive force so as to rotate the drive cam to thereby reciprocate the first roller lifter within the first lifter bore. The fuel inlet aperture extends through a portion of the pump housing to the crankcase chamber and is adapted to receive fuel therethrough. The fuel bypass aperture communicates with the fuel inlet aperture above the crankcase chamber. The fuel inlet aperture supplies a first portion of the fuel to the fuel bypass aperture which has not traversed through the crankcase chamber after entering the fuel inlet aperture. The fuel bypass aperture routes the first portion of the fuel to a fuel volume control valve. The fuel volume control valve supplies a portion of the first portion of the fuel to the first pumping plunger. The pump housing has a first pin aperture extending through the pump housing to the first lifter bore. The pump further includes a first anti-rotation pin extending through the first pin aperture and into an elongated aperture of the first roller lifter to prevent rotation of the first roller lifter.

DETAILED DESCRIPTION

Figure 1:
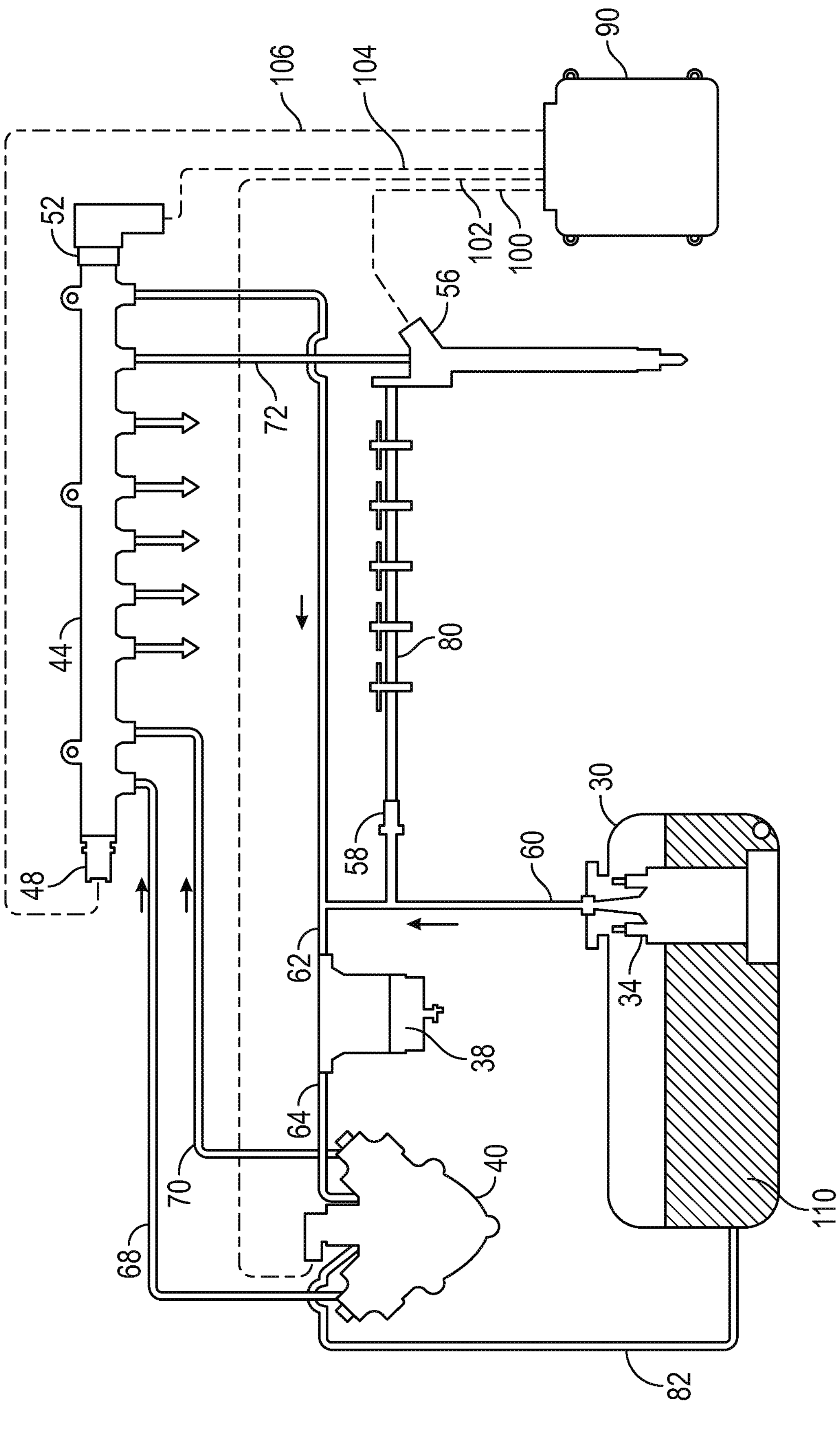
FIG. 1 is a schematic of a fuel control system having a fuel pump in accordance with an exemplary embodiment.

Referring to FIG. 1, a fuel control system 20 having a fuel pump 40 in accordance with an exemplary embodiment is illustrated. The fuel control system 20 includes a fuel tank 30, a pre-filter unit 34, a fuel filter 38, a fuel pump 40, a common rail 44, a rail pressure sensor 48, a pressure control valve 52, a fuel injector 56, a pressure holding valve 58, pre-supply pressure lines 60, 62, 64, high-pressure lines 68, 70, 72, fuel return lines 80, 82, a controller 90, and electrical lines 100, 102, 104, 106.

The fuel tank 30 has the filter unit 34 disposed therein. The fuel tank 30 further holds the fuel 110 therein.

The pre-supply pressure line 60 is fluidly coupled between the pre-filter unit 34 and the pre-supply pressure line 62 which is further coupled to the fuel filter 38. Fuel is routed through the pre-supply pressure line 60 to the pre-supply pressure line 62 and into the fuel filter 38 which filters the fuel.

The pre-supply pressure line 64 is fluidly coupled between the fuel filter 38 and the fuel pump 40. The pre-supply pressure line 64 routes the filtered fuel from the fuel filter 38 to the fuel pump 40.

The fuel pump 40 is fluidly coupled to the common rail 44 utilizing high pressure lines 68, 70. Also, the fuel pump 40 is fluidly coupled to the fuel tank 30 utilizing the fuel return line 82. The fuel pump 40 pumps a portion of the fuel to the common rail 44 based on a control signal received from the controller 90 via the electrical line 102. Further, the fuel pump 40 returns another portion of the fuel from a crankcase chamber 300 (shown in FIG. 12) to the fuel tank 30.

The common rail 44 is fluidly coupled to the fuel injector 56 utilizing the high-pressure line 72. The common rail 44 routes a portion of the received fuel to the fuel injector 56 via the high-pressure line 72.

The rail pressure sensor 48 is coupled to the common rail 44 and generates a signal indicative of the fluid pressure in the common rail 44 that is received by the controller 90 via an electrical line 106. The pressure control valve 52 is operably coupled to the common rail 44 and controls an amount of fuel released from the common rail 44 to the pre-supply pressure line 62 and fuel filter 38 in response to a control signal received from the controller 90 via an electrical line 104.

The fuel injector ejector 56 emits a predetermined amount of fuel based on a control signal received from controller 90 via the electrical line 100. A portion of unused fuel from the fuel injector 56 is routed through the fuel return line 80 to a pressure holding valve 58.

The pressure holding valve 58 is fluidly coupled to the pre-supply pressure line 60 and routes the received fuel to the fuel filter 38 when a pressure level at the valve 58 is greater than a threshold pressure level.

Fuel Pump

Referring to FIGS. 1-11, the fuel pump 40 in accordance with an exemplary embodiment is provided to pump fuel to the common rail 44 utilizing the high-pressure lines 68, 70. Also, the fuel pump 40 returns some fuel to the fuel tank 30 utilizing the fuel return line 82. Referring to FIGS. 1, 7 and 9-11, the fuel pump 40 includes a pump housing 130, a camshaft 134, a cover member 138, first and second roller lifters 141, 142, first and second pumping plungers 151, 152, first and second spring retainers 161, 162, first and second springs 171, 172, first and second cylinder heads 181, 182, first and second one-way check valves 191, 192, first and second high-pressure release valves 201, 202, first and second caps 211, 212, a fuel volume control valve 220, first and second anti-rotation pins 221, 222, sealing ball bearings 231, 232, and an overflow valve 240.

An advantage of the fuel pump 40 is that the pump 40 utilizes a fuel bypass aperture 320 (shown in FIG. 12) to route fuel to first and second cylinder heads 181, 182 that has not traversed through a crankcase chamber 300 after entering a fuel inlet aperture 302. As a result, the fuel pump 40 pumps fuel (that does not have debris from the crankcase chamber 300 therein) to a downstream common rail 44 (shown in FIG. 1) and fuel injector 56—which prevents the fuel injector 56 from being damaged from such debris. Further, the fuel that is routed to the crankcase chamber 300 is returned to a fuel tank 30 utilizing a fuel return line 82 for subsequent filtering by a fuel filter 38. Another advantage of the fuel pump 40 is that the pump 40 utilizes first and second anti-rotation pins 221, 222 to prevent first and second roller lifters 141, 142, respectively, from rotating relative to longitudinal axes of the first and second roller lifters 141, 142. As a result, the first and second roller lifters 141, 142 do not damage a drive cam 422 due to such rotation about the longitudinal axes.

Pump Housing

Figure 15:
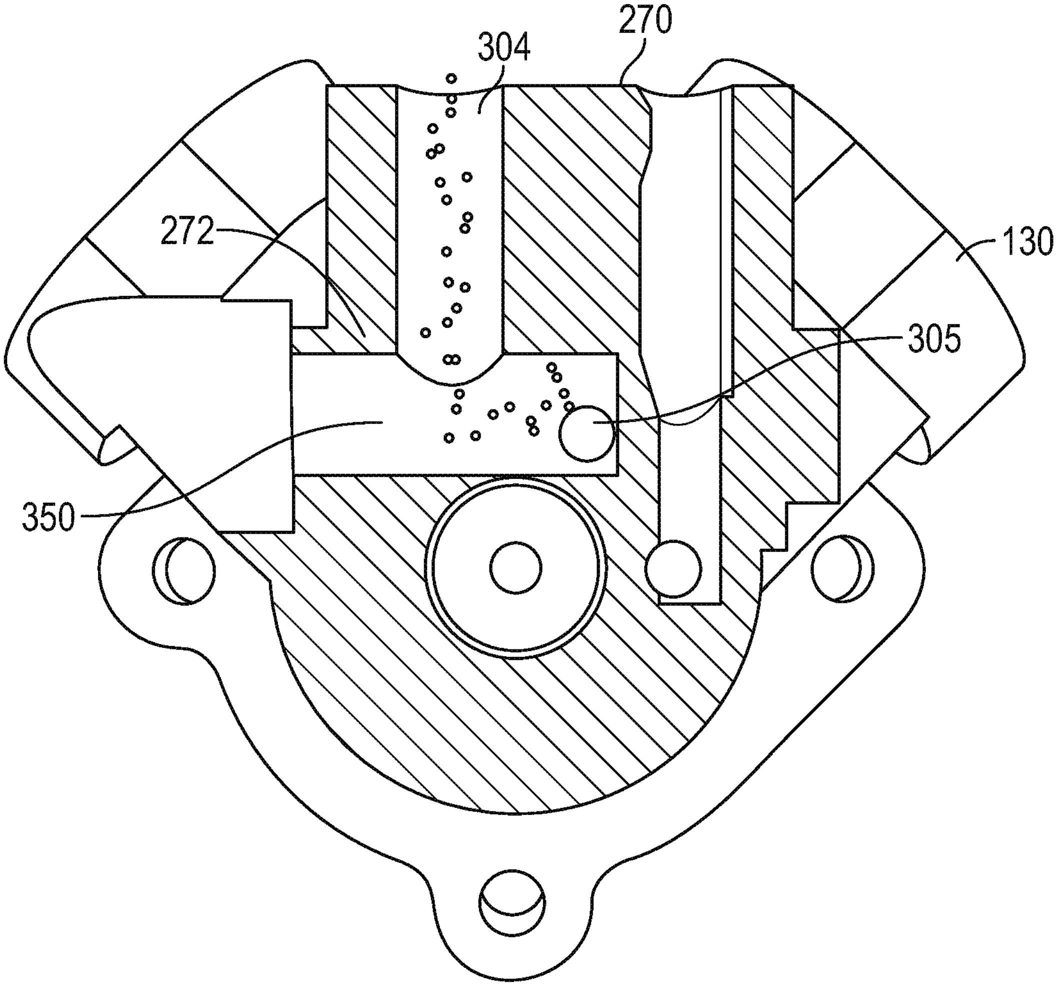
FIG. 15 is a cross-sectional view of a portion of the fuel pump of FIG. 5 taken along lines 15-15 in FIG. 5.
Figure 17:
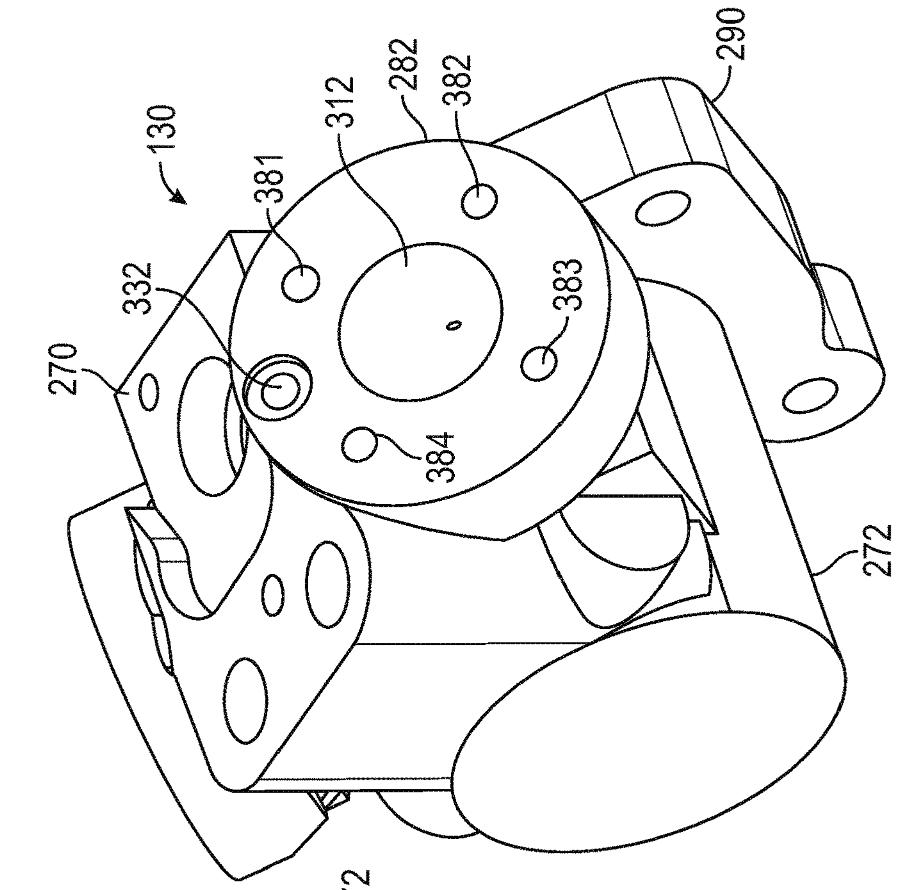
FIG. 17 is another isometric view of the pump housing of FIG. 16.
Figure 16:
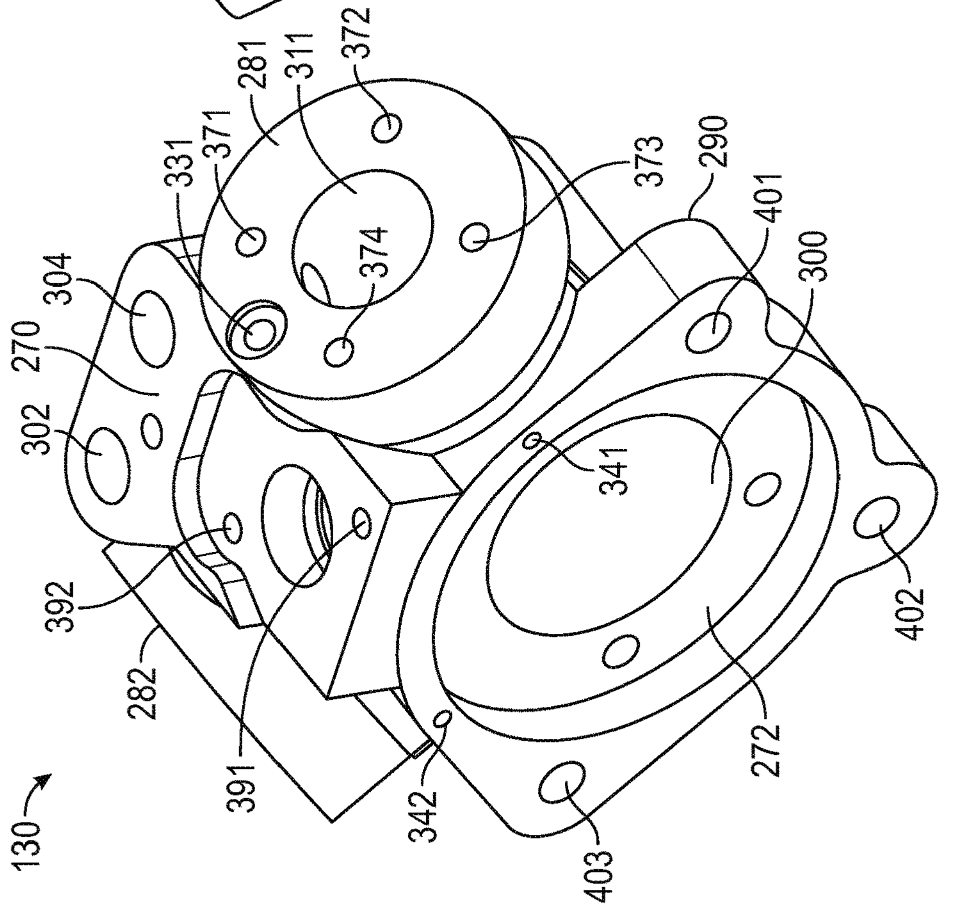
FIG. 16 is an isometric view of a pump housing utilized in the fuel pump of FIG. 2.
Figure 19:
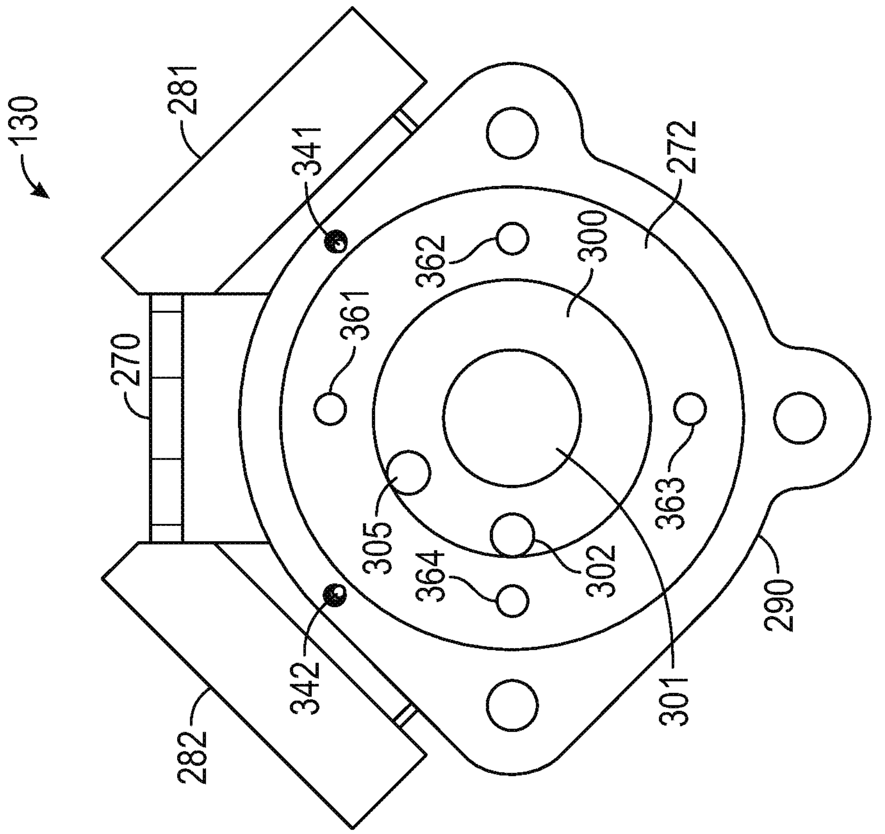
FIG. 19 is a front view of the pump housing of FIG. 16.
Figure 18:
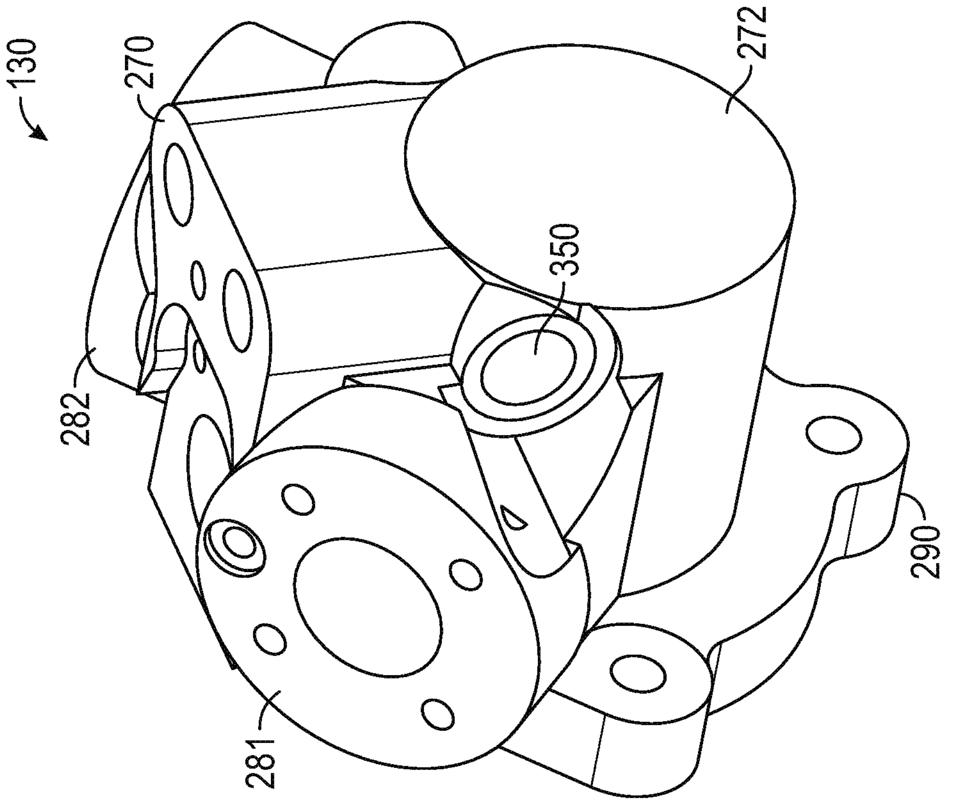
FIG. 18 is another isometric view of the pump housing of FIG. 16.
Figure 20:
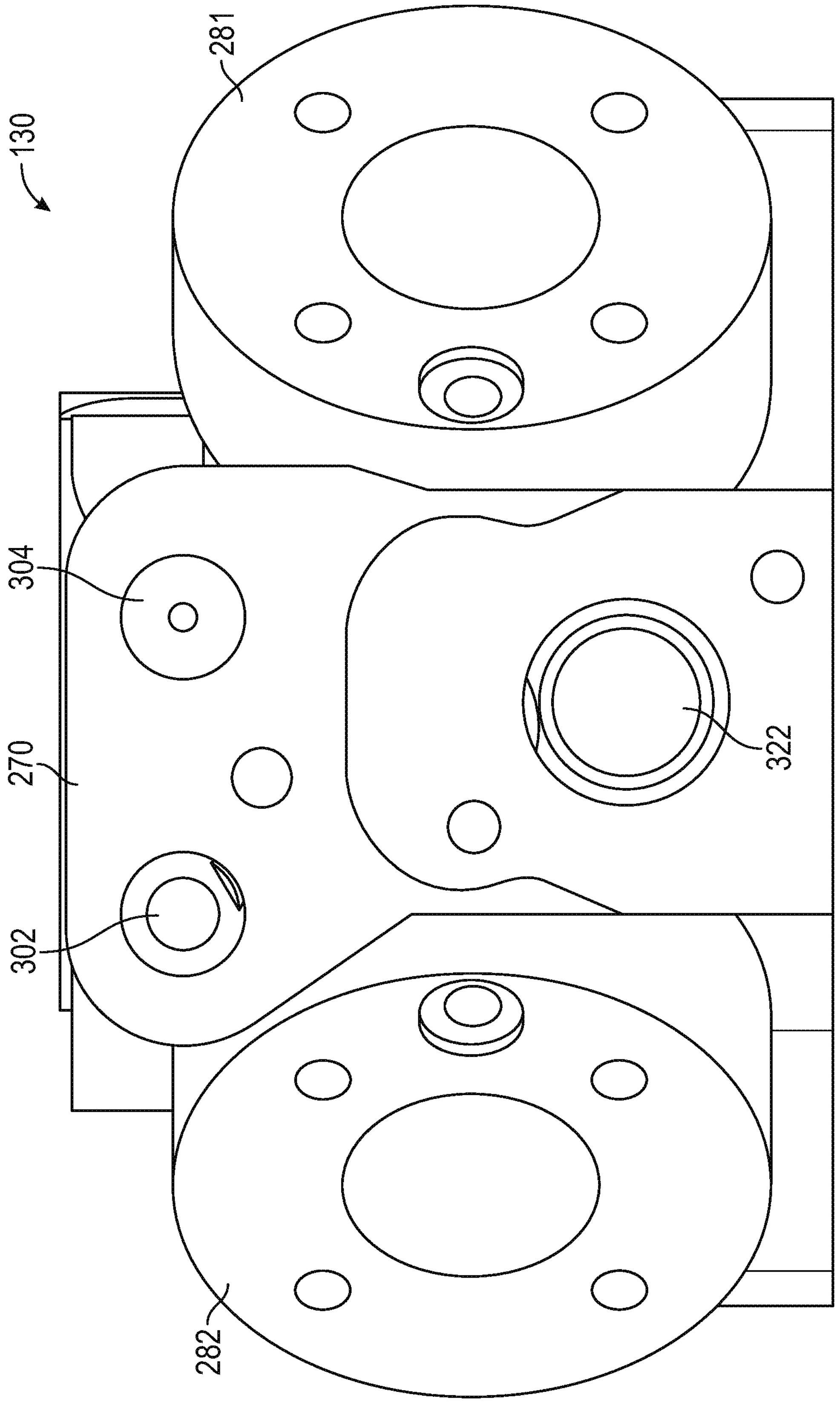
FIG. 20 is a top view of the pump housing of FIG. 16.

Referring to FIGS. 16-25, the pump housing 130 is provided to hold the remaining components of the fuel pump 40 thereon. The pump housing 130 includes a top portion 270, a crankcase portion 272, first and second head mounting portions 281, 282, and a mounting flange portion 290. The pump housing 130 further includes a crankcase chamber 300, a cam aperture 301, a fuel inlet aperture 302, a fuel outlet aperture 304, a connecting aperture 305, first and second lifter bores 311, 312, a fuel bypass aperture 320 (shown in FIG. 13), a control valve chamber 322, first and second fuel feed apertures 331, 332 (shown in FIG. 9), first and second pin apertures 341, 342, and an overflow aperture 350 (shown in FIG. 15). Referring to FIGS. 16, 17 and 19, the pump housing 130 further includes cover bolt holes 361, 362, 363, 364 (shown in FIG. 19), head bolt holes 371, 372, 373, 374 (shown in FIG. 16), head bolt holes 381, 382, 383, 384 (shown in FIG. 17), control valve bolt holes 391, 392 (shown in FIG. 16), and mounting flange bolt holes 401, 402, 403. In an exemplary embodiment, the pump housing 130 is constructed of a metal such as steel for example.

The top portion 270 is integrally formed on top of the crankcase portion 272. The first and second head mounting portions 281, 282 are integrally formed on top of the crankcase portion 272 on opposite sides of the top portion 270. The mounting flange portion 290 is integrally formed with the crankcase portion 272.

Figure 12:
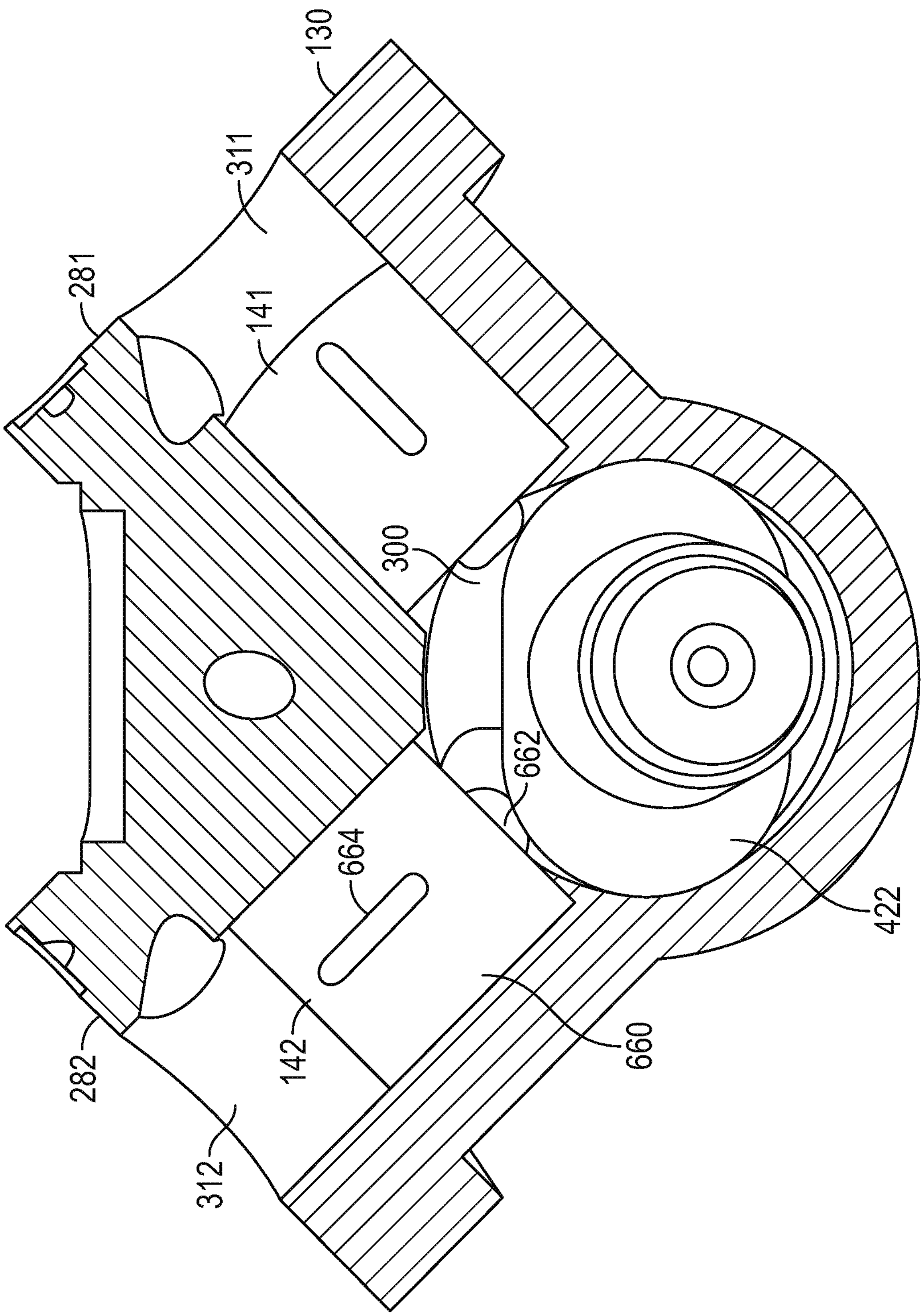
FIG. 12 is a cross-sectional view of a portion of the fuel pump of FIG. 6 taken along lines 12-12 in FIG. 6.
Figure 13:
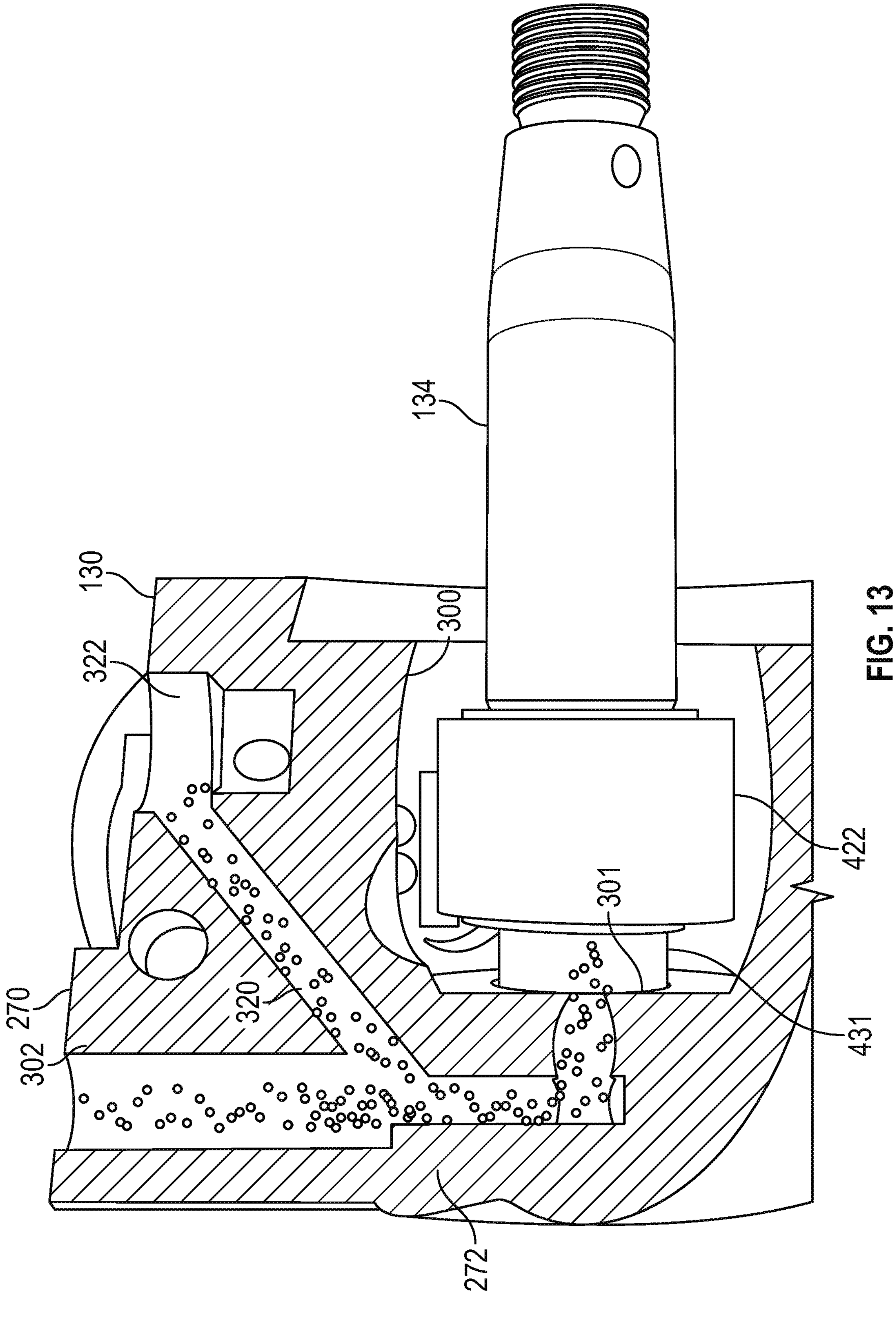
FIG. 13 is a cross-sectional view of a portion of the fuel pump of FIG. 2 taken along lines 13-13 in FIG. 2
Figure 14:
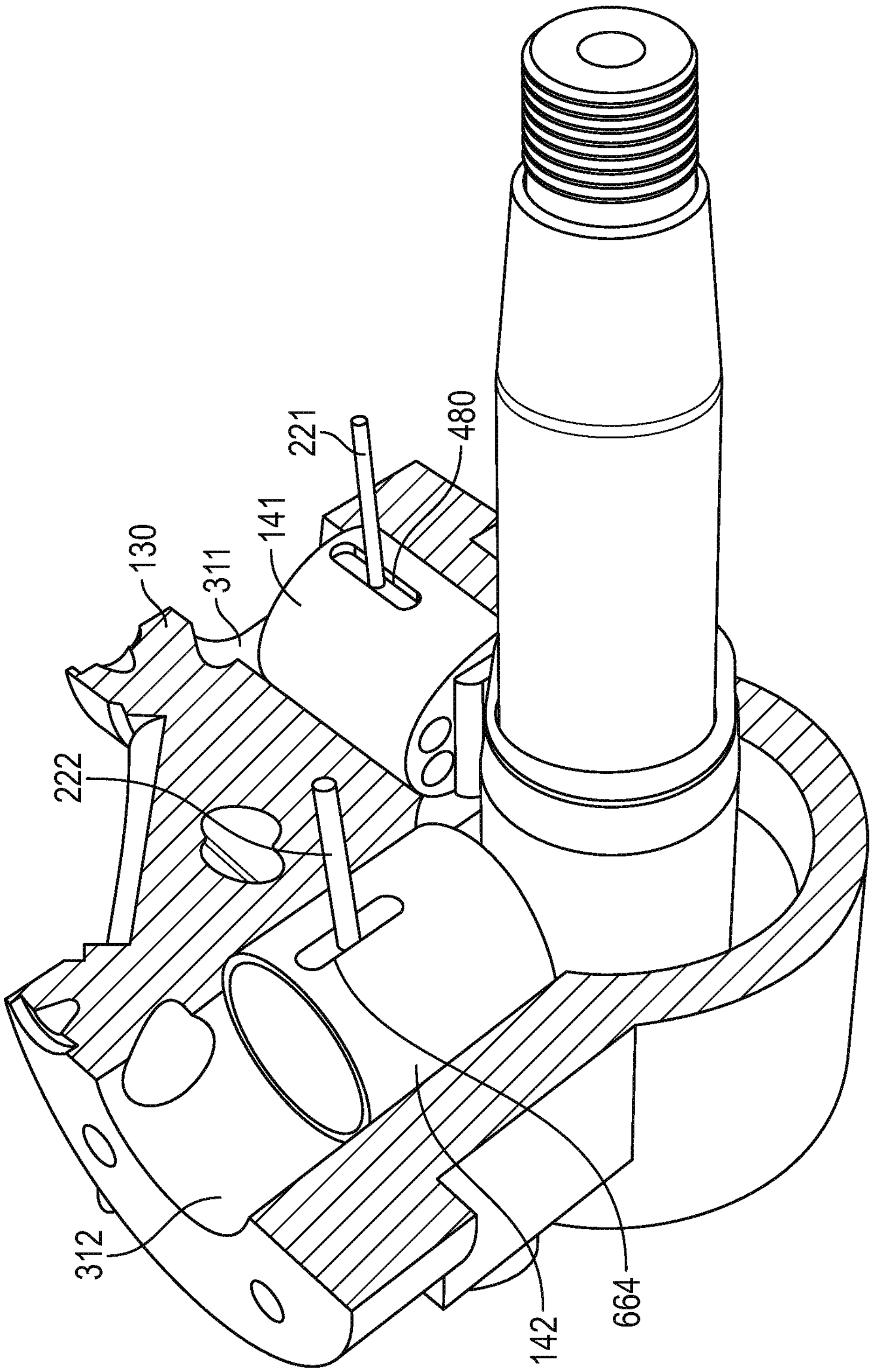
FIG. 14 is a cross-sectional view of a portion of the fuel pump of FIG. 2 taken along lines 14-14 in FIG. 2

Referring to FIGS. 12, 13 and 19, the crankcase chamber 300 is formed in the crankcase portion 272. The crankcase chamber 300 is sized and shaped to receive the drive cam 422 therein.

Referring to FIGS. 13 and 19, the cam aperture 301 communicates with the crankcase chamber 300 and extends further into the crankcase portion 272. The cam aperture 301 is sized and shaped to receive a portion of the camshaft 134 therein.

Figure 27:
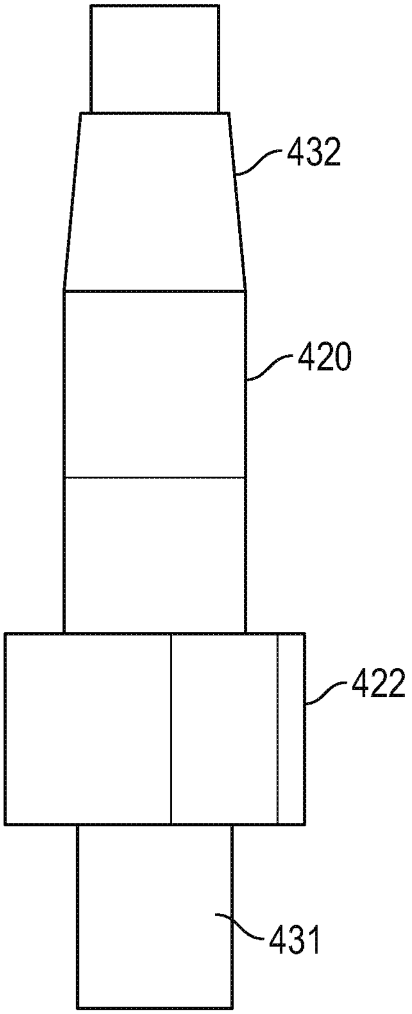
FIG. 27 is a side view of the camshaft of FIG. 26.

Referring to FIGS. 13 and 27, the fuel inlet aperture 302 extends through the top portion 270 and the crankcase portion 272 to the crankcase chamber 300. The fuel inlet aperture 302 is adapted to receive fuel from the fuel filter 38 (shown in FIG. 1) and to supply fuel to the fuel bypass aperture 320 which has not traversed through the crankcase chamber 300 after entering the fuel inlet aperture 302.

Referring to FIGS. 15 and 16, the fuel outlet aperture 304 extends through the crankcase portion 272 to the top portion 270. Excess fuel in the crankcase chamber 300 is routed through the fuel outlet aperture 302 to the fuel return line 82 (shown in FIG. 1).

Referring to FIGS. 15, 16 and 19, the connecting aperture 305 fluidly connects the overflow aperture 350 to the fuel outlet aperture 304.

Referring to FIGS. 12, 16 and 17, the first lifter bore 311 extends through the first head mounting portion 281 to the crankcase chamber 300. The first lifter bore 311 is sized and shaped to receive the first roller lifter 141 therein and communicates with the crankcase chamber 300.

The second lifter bore 312 extends through the second head mounting portion 282 to the crankcase chamber 300. The second lifter bore 312 is sized and shaped to receive the second roller lifter 142 therein and communicates with the crankcase chamber 300.

Referring to FIGS. 9, 13, 24 and 25, the fuel bypass aperture 320 is provided to route fuel to the fuel volume control valve 220 which further routes the fuel to the first and second cylinder heads 181, 182. The fuel bypass aperture 320 (shown in FIG. 13) communicates with the fuel inlet aperture 302 above the crankcase chamber 300. Further, the fuel bypass aperture 320 communicates and extends between the fuel inlet aperture 302 and the control valve chamber 322. During operation, the fuel inlet aperture 320 routes a first portion of the fuel to the fuel bypass aperture 320 which supplies the first portion of the fuel to a fuel volume control valve 220 in the control valve chamber 322. An advantage of the fuel bypass aperture 320 is that the aperture 230 routes fuel to the first and second cylinder heads 181, 182 that does not have debris from the crankcase chamber 300 therein.

Referring to FIGS. 9, 13, 23 and 25, the control valve chamber 322 is formed in the top portion 270 of the pump housing 130. The control valve chamber 322 is sized and shaped to hold the fuel volume control valve 220 therein. The control valve chamber 322 fluidly communicates with the fuel bypass aperture 320 (shown in FIG. 13) and the first and second fuel feed apertures 331, 332 (shown in FIG. 9).

Figure 9:
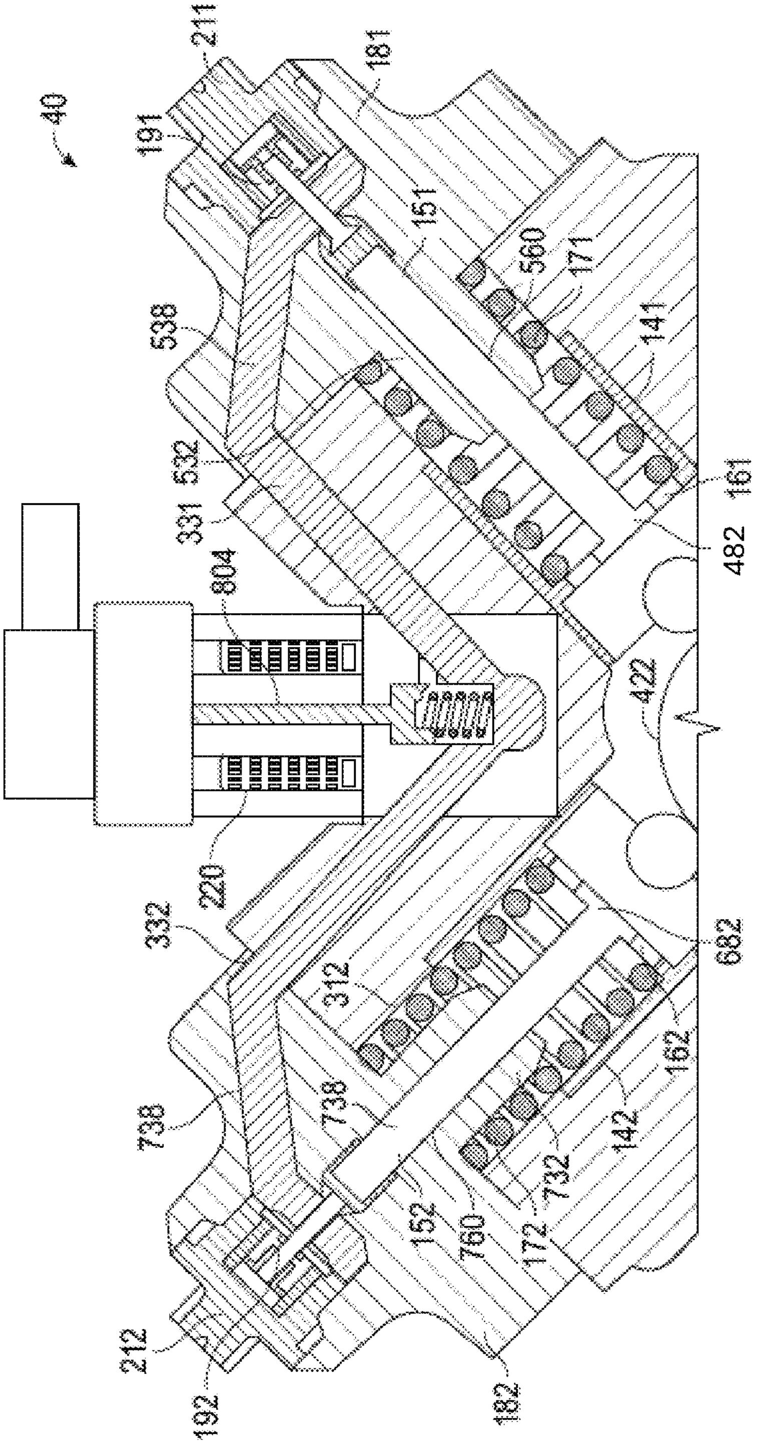
FIG. 9 is a cross-sectional view of a portion of the fuel pump of FIG. 6 taken along lines 9-9 in FIG. 6.
Figure 23:
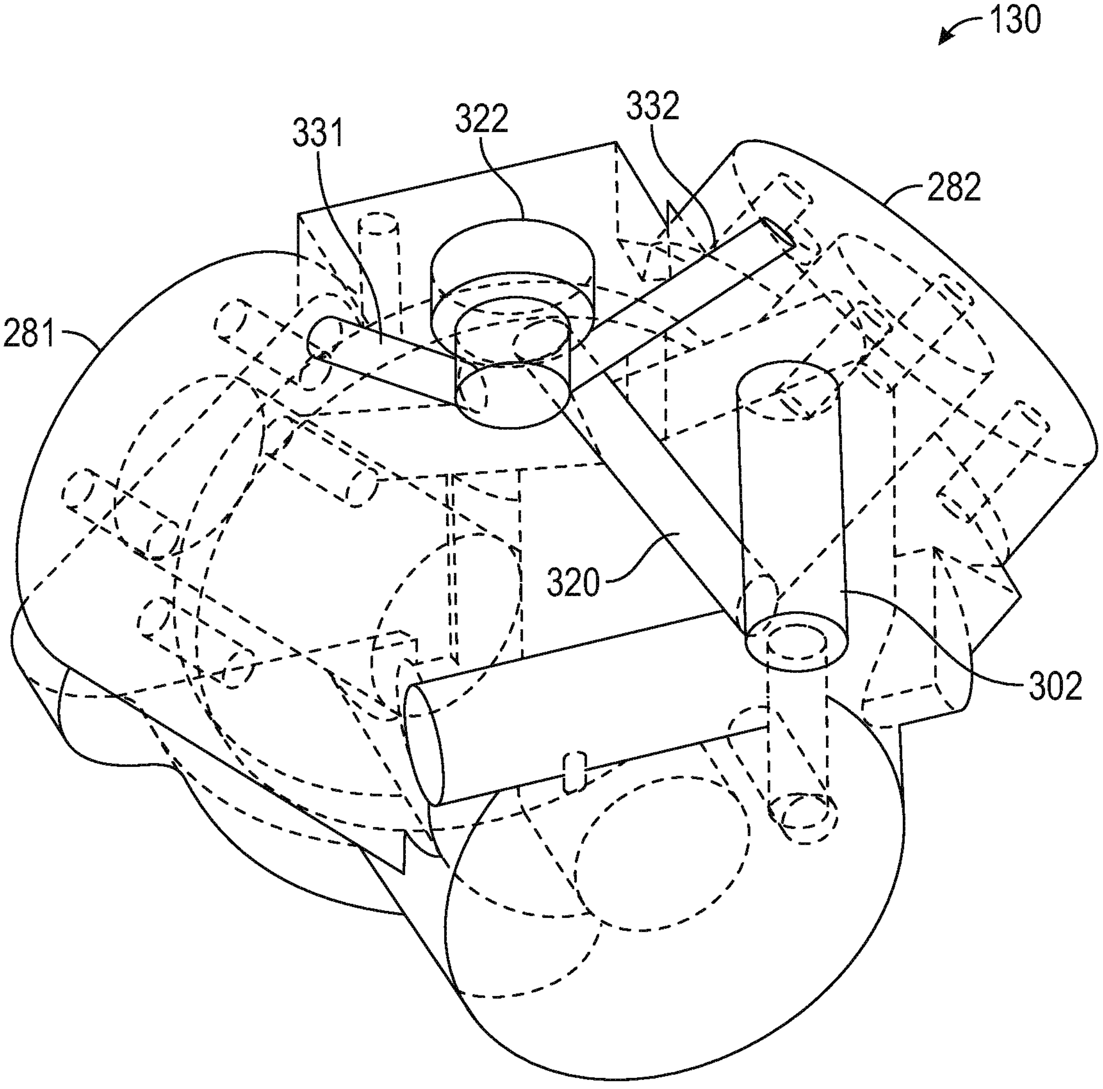
FIG. 23 is a transparent isometric view of the pump housing of FIG. 16 illustrating a flow path of fuel from a fuel inlet aperture to first and second head mounting portions.
Figure 24:
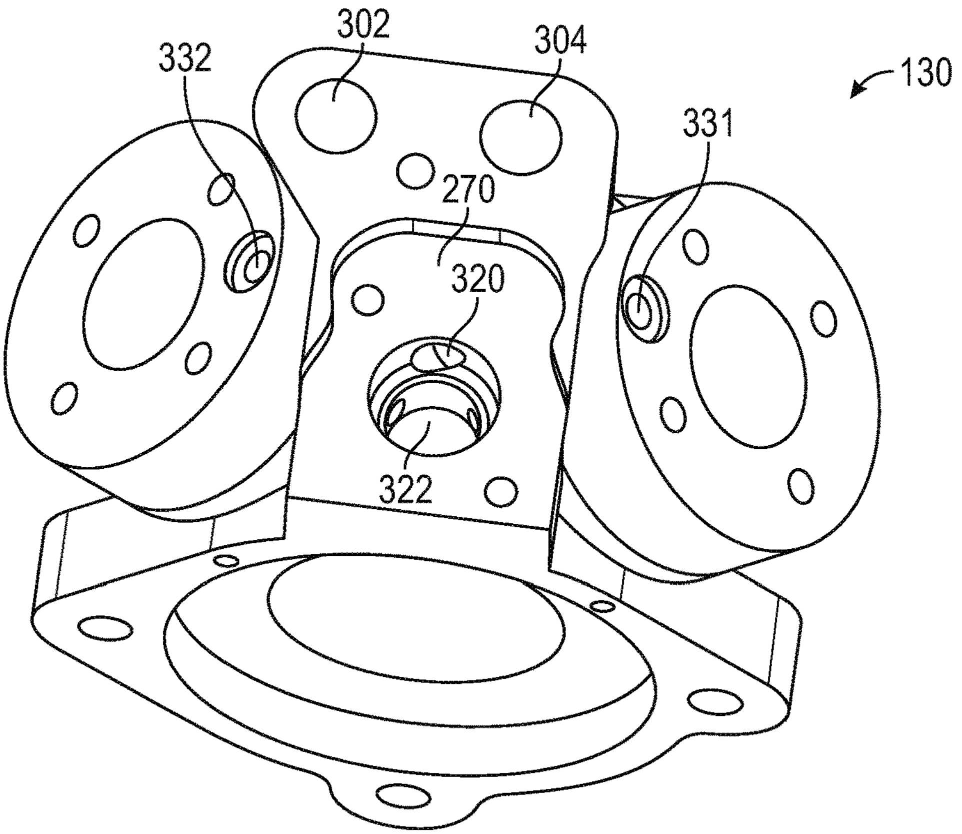
FIG. 24 is another isometric view of the pump housing of FIG. 16.
Figure 25:
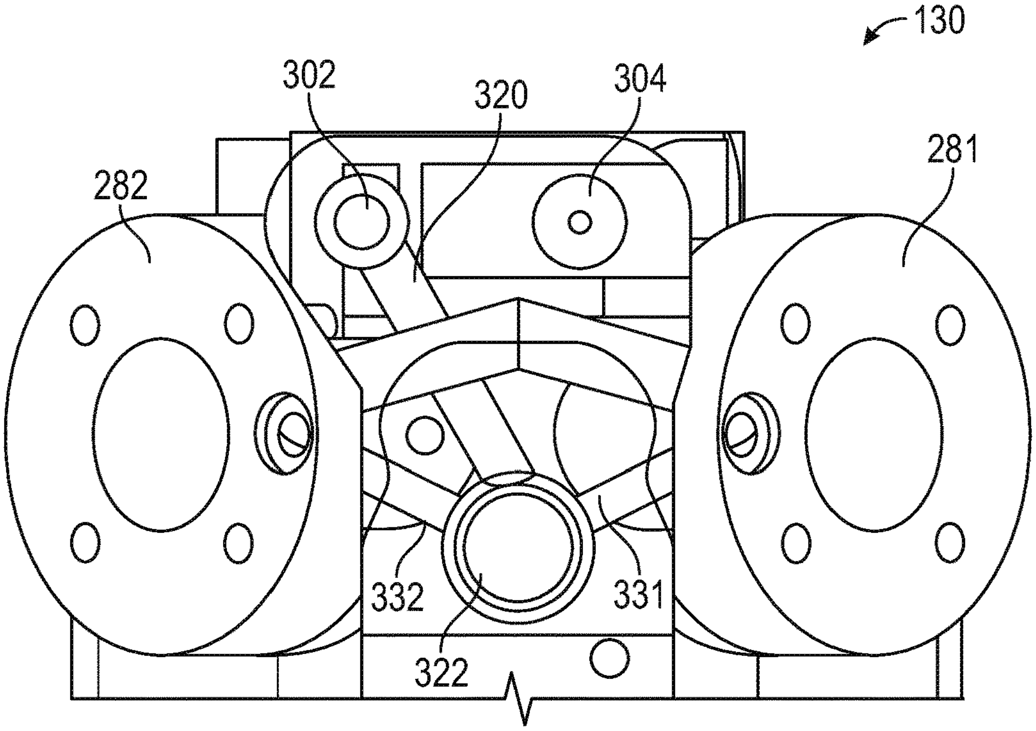
FIG. 25 is a transparent top view of the pump housing of FIG. 16 illustrating a flow path of fuel from a fuel inlet aperture to first and second head mounting portions.
Figure 26:
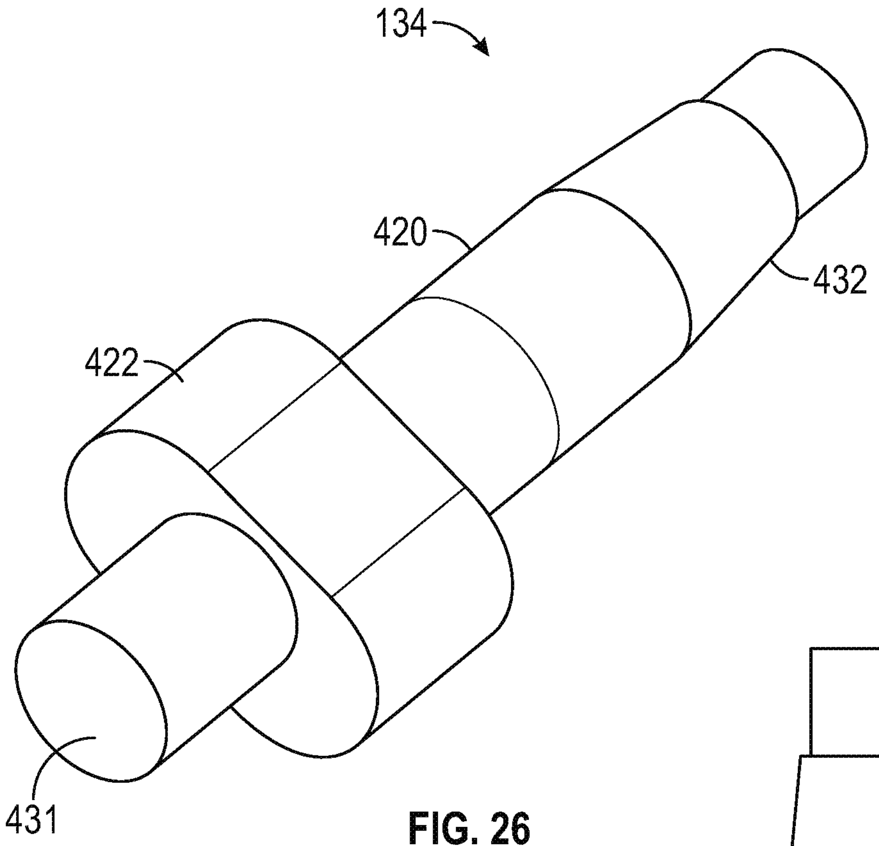
FIG. 26 is an isometric view of a camshaft utilized in the fuel pump of FIG. 2.

Referring to FIGS. 9, 23 and 25, the first fuel feed aperture 331 extends from the control valve chamber 322 to fuel feed aperture 538 (shown in FIG. 9) of the first cylinder head 181. The first fuel feed aperture 331 routes fuel from the fuel volume control valve 220 to the first cylinder head 181.

The second fuel feed aperture 332 extends from the control valve chamber 322 to fuel feed aperture 738 (shown in FIG. 9) of the second cylinder head 182. The second fuel feed aperture 332 routes fuel from the fuel volume control valve 220 to the second cylinder head 182.

Figure 7:
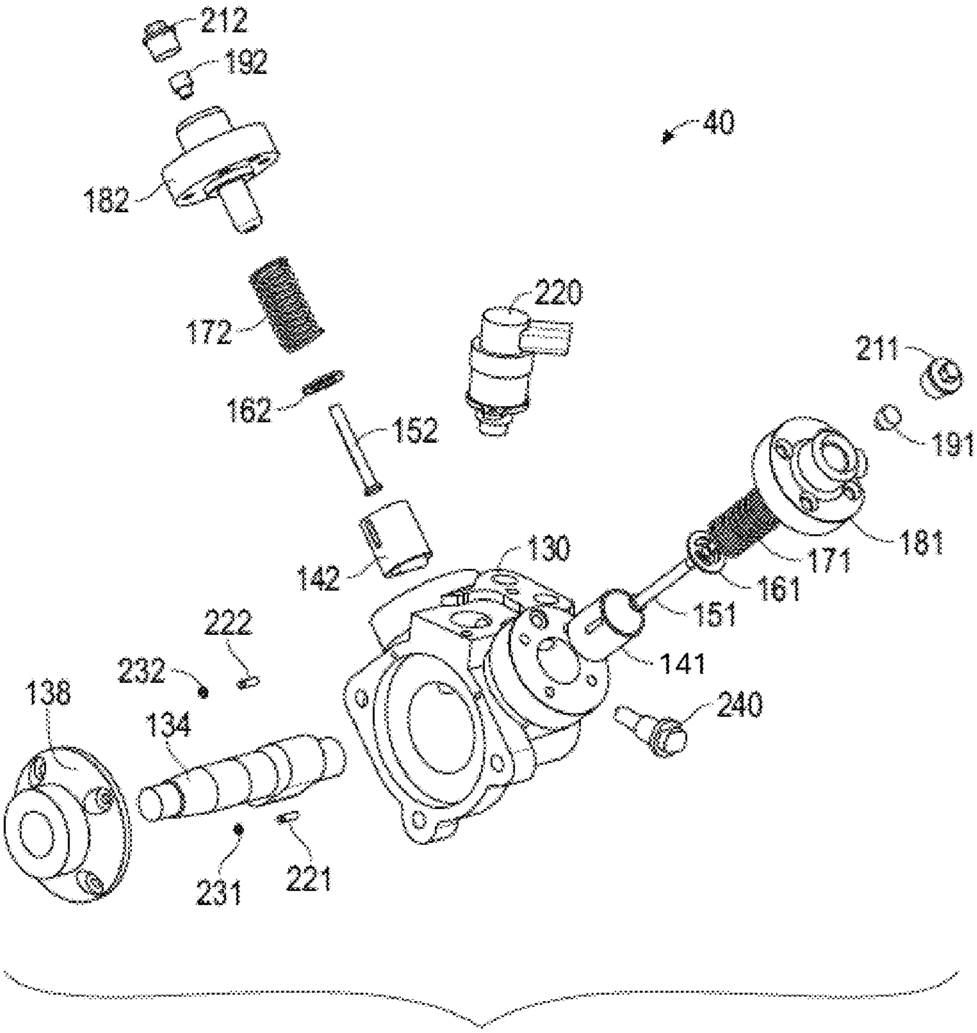
FIG. 7 is an exploded view of the fuel pump of FIG. 2.

Referring to FIGS. 7, 16 and 19, the first pin aperture 341 extends through the mounting flange portion 290 and through a portion of the first head mounting portion 281 to the first lifter bore 311. The first pin aperture 341 is sized and shaped to receive the first anti-rotation pin 221 therethrough.

The second pin aperture 342 extends through the mounting flange portion 290 and through a portion of the second head mounting portion 282 to the second lifter bore 312. The second pin aperture 342 is sized and shaped to receive the second anti-rotation pin 222 therethrough.

Figure 22:
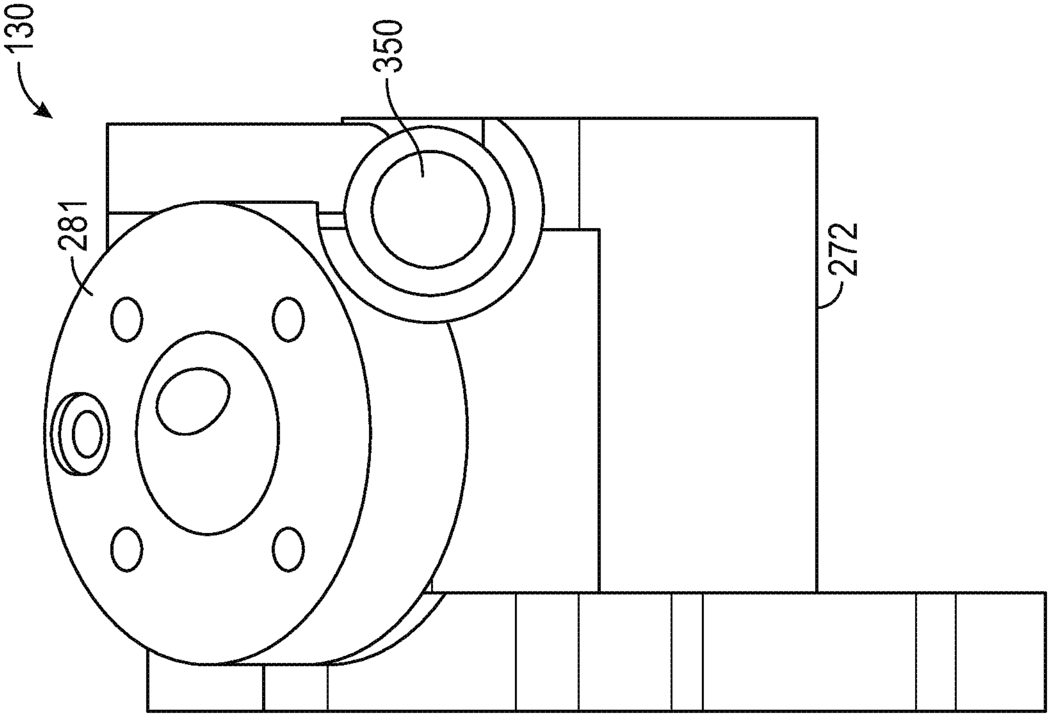
FIG. 22 is a second side view of the pump housing of FIG. 16.
Figure 21:
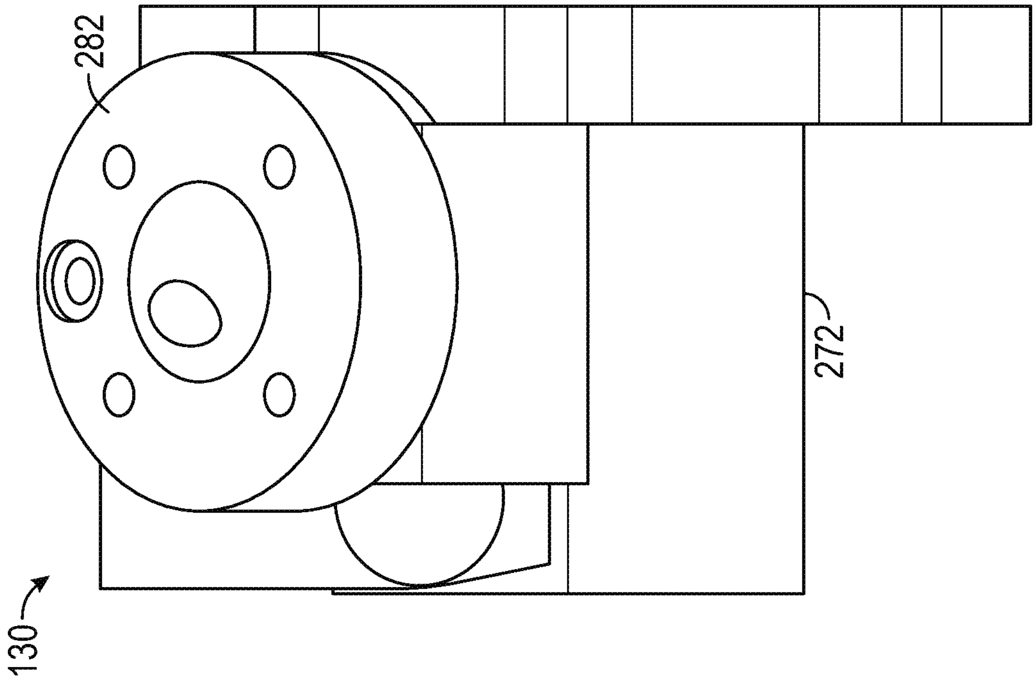
FIG. 21 is a first side view of the pump housing of FIG. 16.

Referring to FIGS. 15 and 22, the overflow aperture 350 is provided to hold the overflow valve 240 (shown in FIG. 42) therein. The overflow aperture 350 extends into the crankcase portion 272 and fluidly communicates with the fuel outlet aperture 304 and the connecting aperture 305.

Figure 28:
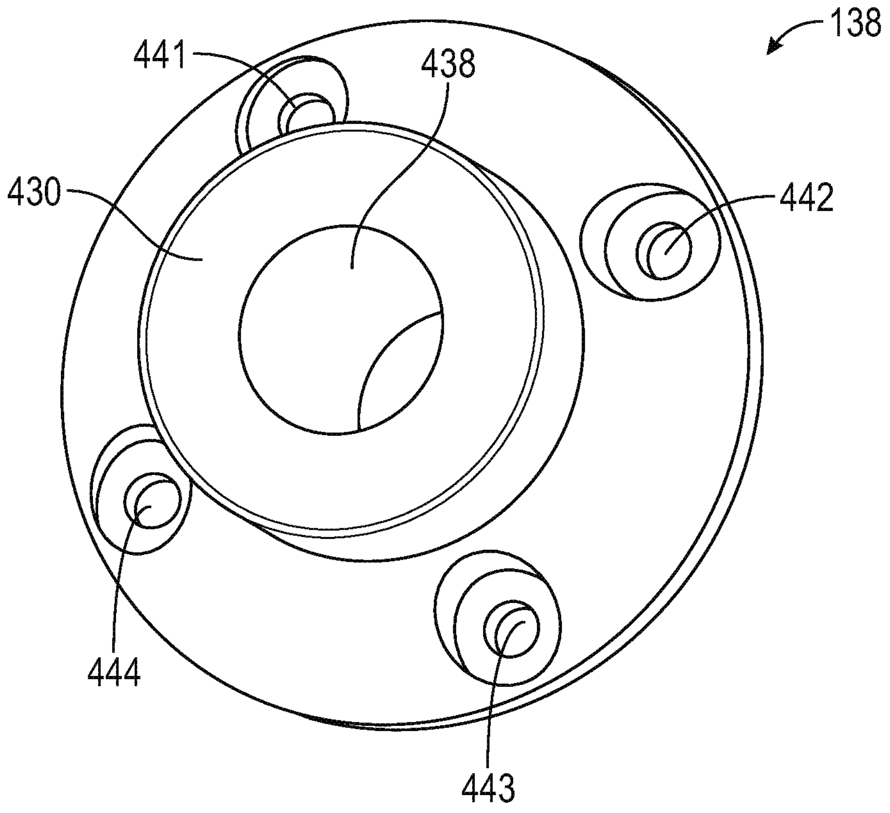
FIG. 28 is isometric view of a cover member utilized in the fuel pump of FIG. 2.
Figure 29:
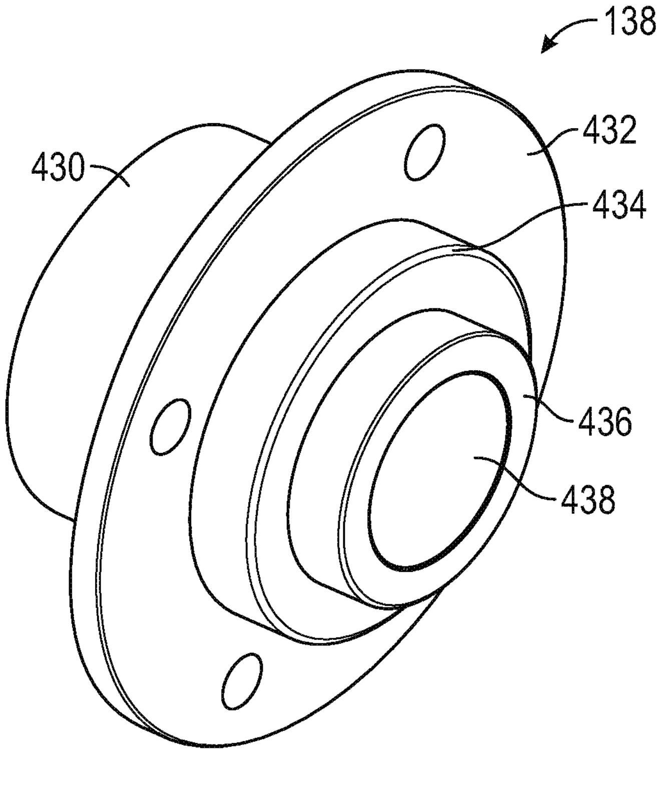
FIG. 29 is another isometric view of the cover member of FIG. 28.
Figure 30:
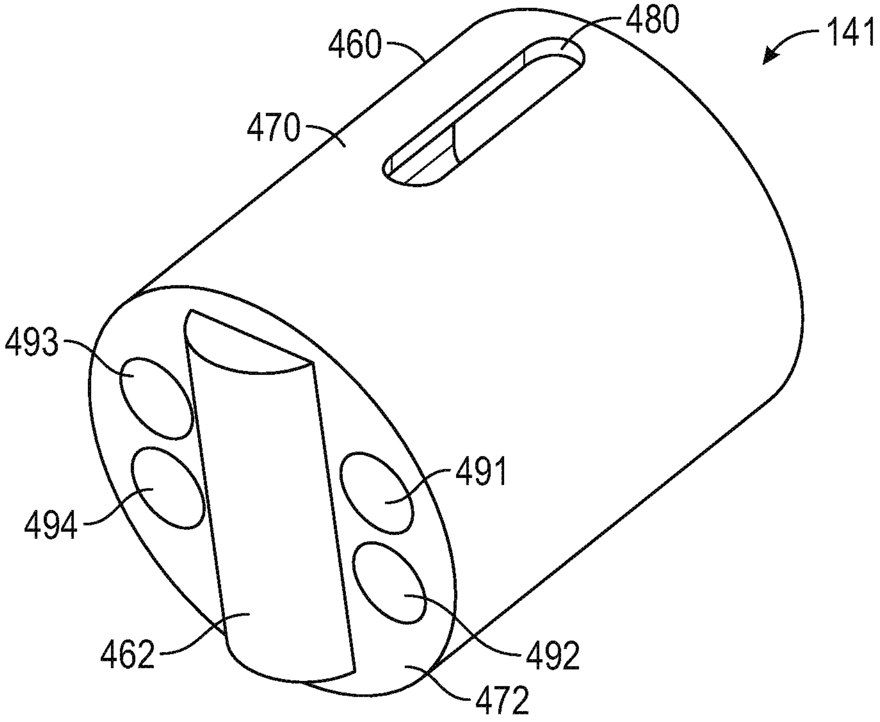
FIG. 30 is an isometric view of a first roller lifter utilized in the fuel pump of FIG. 2.
Figure 31:
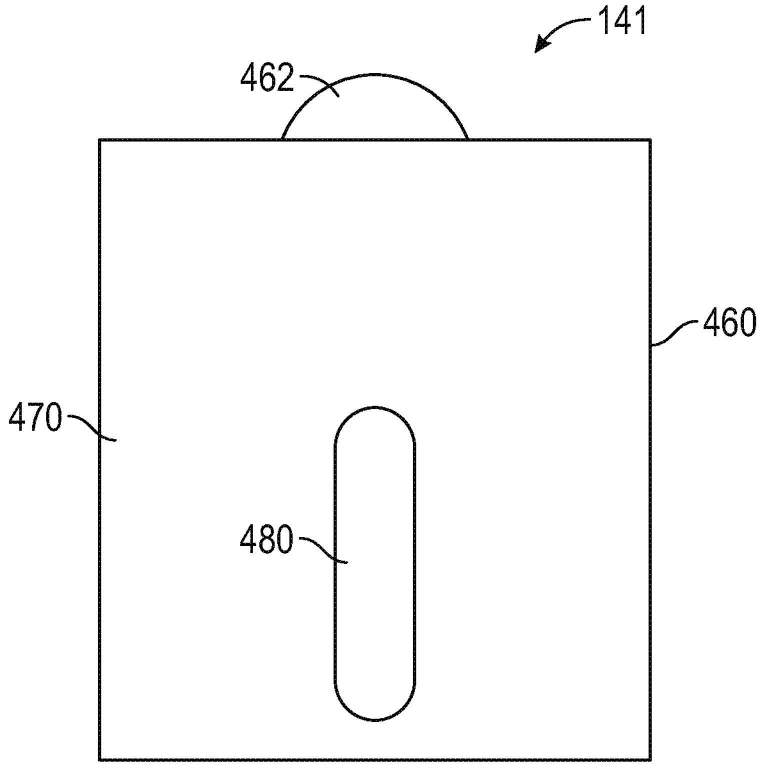
FIG. 31 is a side view of the first roller lifter of FIG. 30.
Figure 32:
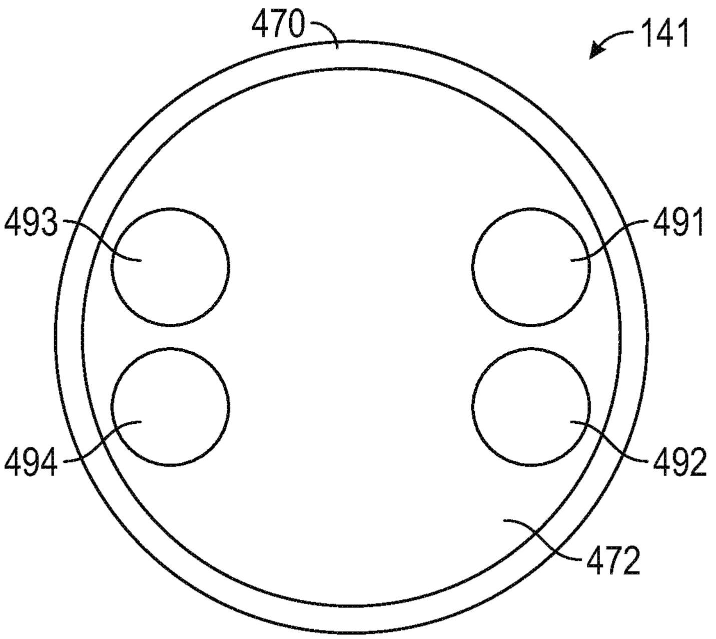
FIG. 32 is a top view of the first roller lifter of FIG. 30.
Figure 33:
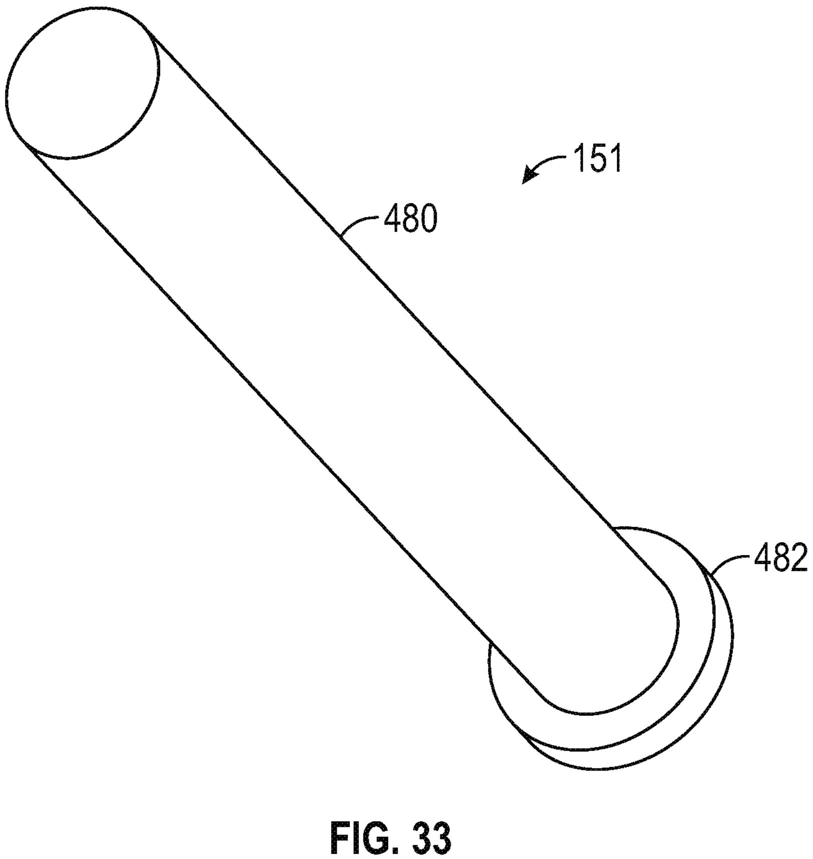
FIG. 33 is an isometric view of a first pumping plunger utilized in the fuel pump of FIG. 2.

Referring to FIGS. 19 and 28, the cover bolt holes 361, 362, 353, 364 extend into the crankcase portion 272 of the pump housing 130 and are disposed around the crankcase chamber 300. The cover member 138 has mounting apertures 441, 442, 443, 444 that are aligned with the cover bolt holes 361, 362, 353, 364, respectively, which each receive a respective bolt (not shown) therethrough to couple the cover member 138 to the crankcase portion 272 of the pump housing 130.

Figure 35:
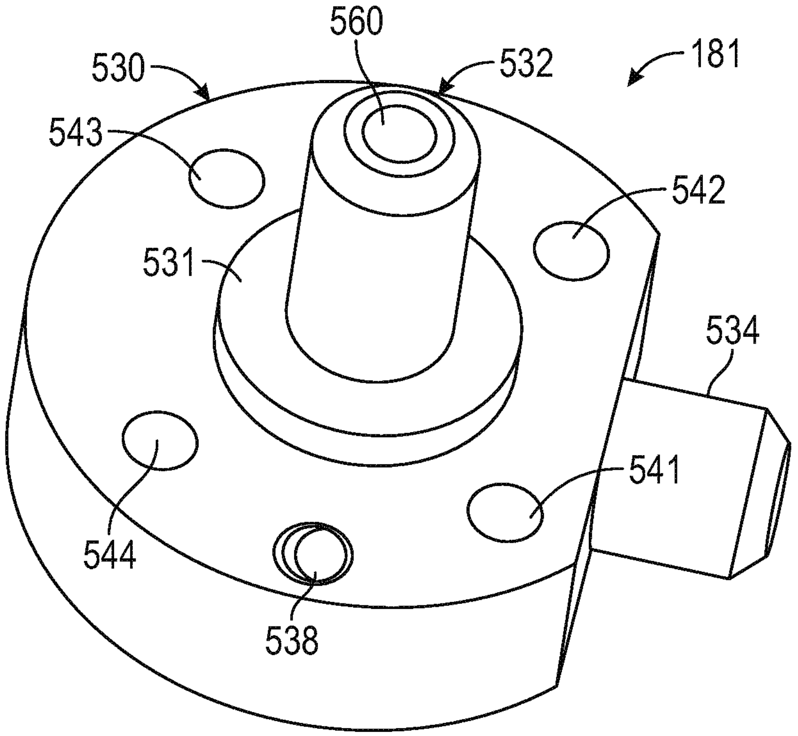
FIG. 35 is an isometric view of a first cylinder head utilized in the fuel pump of FIG. 2.

Referring to FIGS. 16 and 35, the head bolt holes 371, 372, 373, 374 extend into the first head mounting portion 281 of the pump housing 130. The first cylinder head 181 has mounting apertures 541, 542, 543, 544 that are aligned with the head bolt holes 371, 372, 373, 374, respectively, which each receive a respective bolt (not shown) therethrough to couple the first cylinder head 181 to the first head mounting portion 281 of the pump housing 130.

Figure 38:
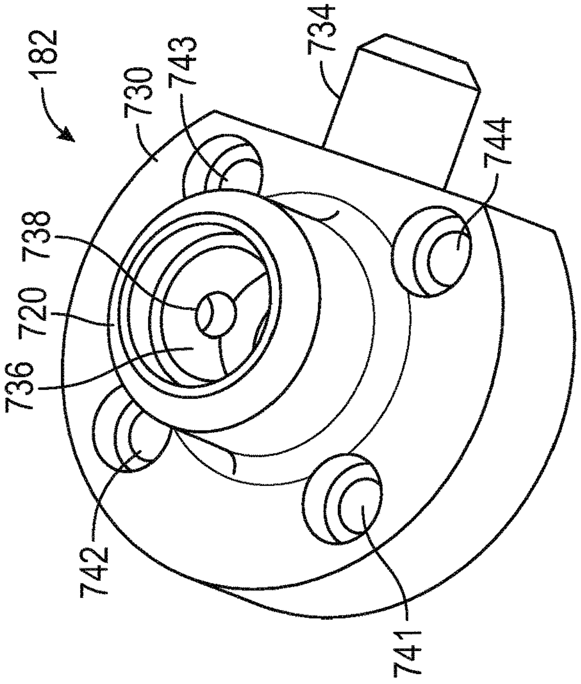
FIG. 38 is an isometric view of a second cylinder head utilized in the fuel pump of FIG. 2.

Referring to FIGS. 17 and 38, the head bolt holes 381, 382, 383, 384 extend into the second head mounting portion 282 of the pump housing 130. The second cylinder head 182 has mounting apertures 741, 742, 743, 744 that are aligned with the head bolt holes 381, 382, 383, 384, respectively, which each receive a respective bolt (not shown) therethrough to couple the second cylinder head 182 to the second head mounting portion 282 of the pump housing 130.

Figure 41:
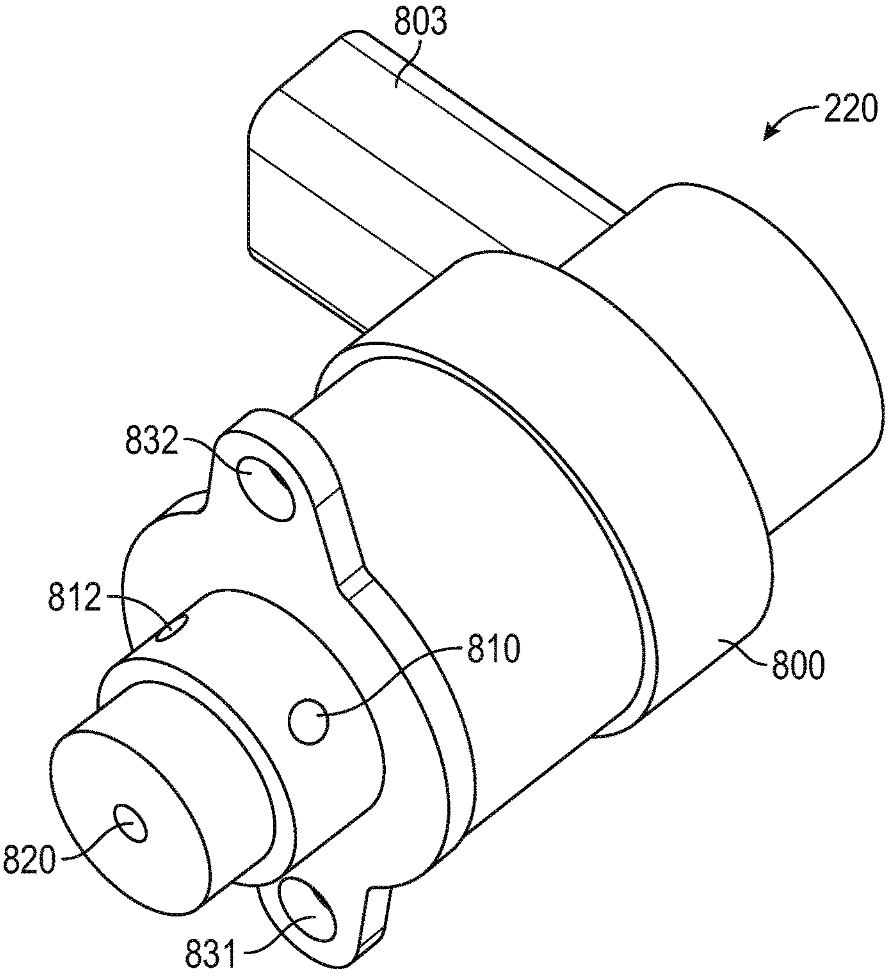
FIG. 41 is an isometric view of a fuel volume control valve utilized in the fuel pump of FIG. 2.

Referring to FIGS. 16 and 41, the valve bolt holes 391, 392 extend into the top portion 270 of the pump housing 130. The fuel volume control valve 220 has mounting apertures 831, 832 that are aligned with the control valve bolt holes 391, 392, respectively, which each receive a respective bolt (not shown) therethrough to couple the fuel volume control valve 220 to the top portion 270 of the pump housing 130.

Referring to FIG. 16, the mounting flange bolt holes 401, 402, 403 extend through the mounting flange portion 290 and are provided for mounting the fuel pump 40 to another component.

Camshaft

Referring to FIGS. 12, 13, 19, 26 and 27, the camshaft 134 includes a shaft 420 and a drive cam 422 coupled to the shaft 420. The shaft 420 includes a first end portion 431 and a second end portion 432, with the drive cam 422 disposed therebetween. The first end portion 431 is disposed in the cam aperture 301 (shown in FIG. 13). The drive cam 422 is disposed in the crankcase chamber 300 and operably contacts the first and second roller lifters 141, 142. The second end portion 431 extends through the central aperture 438 (shown in FIG. 28) of the cover member 138. The camshaft 134 is rotatable by an exterior motive force so as to rotate the drive cam 422 to thereby reciprocate the first and second roller lifters 141, 142 within the first and second lifter bores 311, 312, respectively. In an exemplary embodiment, the camshaft 134 is constructed of a metal such as steel for example.

Cover Member

Referring to FIGS. 2, 19, 28 and 29, the cover member 138 is provided to enclose the crankcase chamber 300 and to support the camshaft 134. The cover member 138 includes a tubular portion 430, a circular mounting flange 432, a tubular portion 434, and a tubular portion 436. The tubular portion 430 is integrally formed with the circular mounting flange 432 and extends in a first direction from the circular mounting flange 432. The tubular portion 434 is integrally formed with the circular mounting flange 432 and extends in a second direction from the circular mounting flange 432. The tubular portion 436 is integrally formed with the tubular portion 434 and extends in the second direction from the tubular portion 434. A central aperture 438 extends through the tubular portion 430, the circular mounting flange 432, the tubular portion 434, and the tubular portion 436. The circular mounting flange 432 includes mounting apertures 441, 442, 443, 444 extending therethrough. The circular mounting flange 432 is coupled to the crankcase portion 272 utilizing bolts extending through the mounting apertures 441, 442, 443, 444 and into the apertures 361, 362, 363, 364, respectively, of the crankcase portion 272. In an exemplary embodiment, the cover member 138 is constructed of a metal such as steel for example.

First Roller Lifter

Referring to FIGS. 9, 12, 30-32, the first roller lifter 141 is provided to reciprocate the first pumping plunger 151 to pump fuel from the first cylinder head 181 to the high-pressure line 68 (shown in FIG. 1). The first roller lifter 141 is disposed in the first lifter bore 311 and operably contacts the drive cam 422. The first roller lifter 141 includes a barrel portion 460 and a roller 462. The barrel portion 460 includes a tubular wall 470 and a bottom wall 472 coupled to an end of the tubular wall 470. The tubular wall 470 includes an elongated aperture 480 extending therethrough. The bottom wall 472 includes first, second, third, and fourth flow apertures 491, 492, 493, 494 extending therethrough. The roller 462 is operably coupled to the bottom wall 472 operably contacts the drive cam 422. In an exemplary embodiment, the first roller lifter 141 is constructed of a metal such as steel for example.

First Anti-Rotation Pin

Referring to FIGS. 7, 14, 16, 19, the first anti-rotation pin 221 extends through the first pin aperture 341 and into an elongated aperture 480 of the first roller lifter 141 to prevent rotation of the first roller lifter 141 in the first lifter bore 311. In an exemplary embodiment, the first anti-rotation pin 221 is constructed of a metal such as steel for example.

First Sealing Ball Bearing

Figure 8:
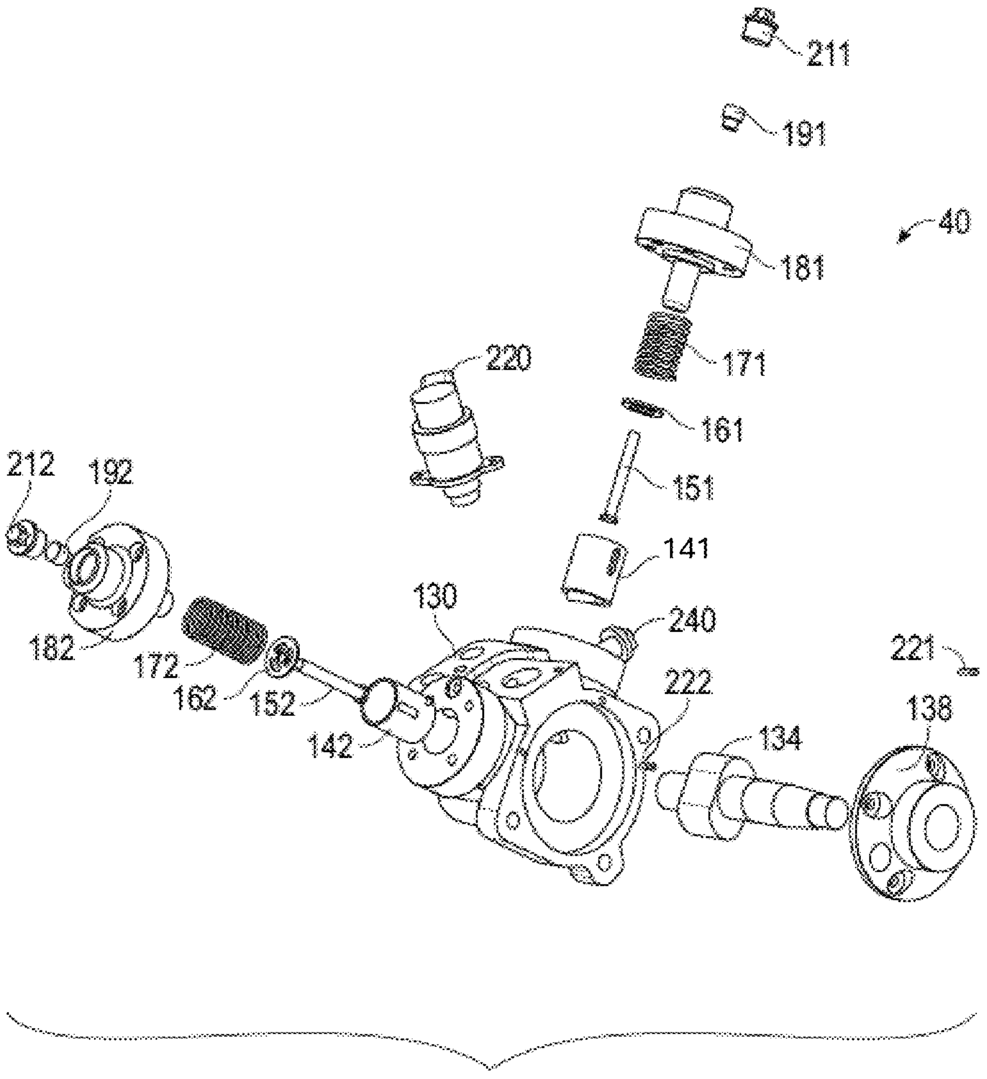
FIG. 8 is another exploded view of the fuel pump of FIG. 2.

Referring to FIGS. 7, 8 and 16, the sealing ball bearing 231 is disposed in the first pin aperture 341 and contacts the first anti-rotation pin 221. The sealing ball bearing 231 prevents fuel from leaking out of the first pin aperture 341.

First Pumping Plunger

Figure 34:
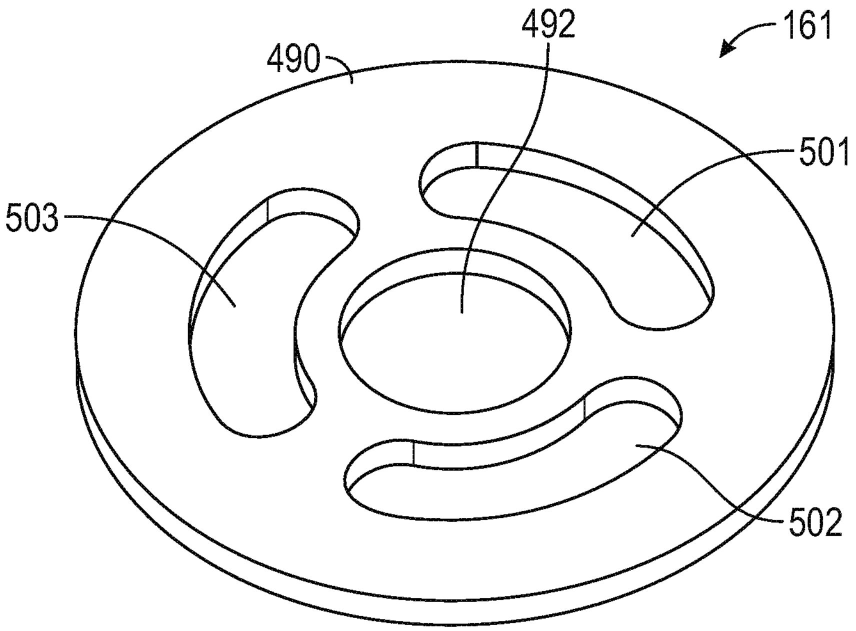
FIG. 34 is an isometric view of a first spring retainer utilized in the fuel pump of FIG. 2.

Referring to FIGS. 7-9 and 33, the first pumping plunger 151 is provided to pump fuel from the first cylinder head 181. The first pumping plunger 151 includes a shaft 480 and a head 482 coupled to an end of the shaft 480. The first pumping plunger 151 is disposed in the first lifter bore 311 and the head 482 contacts the bottom wall 472 of the first roller lifter 141. The shaft 480 of the first pumping plunger 151 extends through an aperture 492 (shown in FIG. 34) in the first spring retainer 161 such that the first spring retainer 161 is disposed in the first roller lifter 141. The shaft 480 of the first pumping plunger 151 is received in a longitudinal aperture 560 (shown in FIG. 9) extending through the first barrel portion 532 (shown in FIG. 35) and a portion of a central body 530 of the first cylinder head 181. In an exemplary embodiment, the first pumping plunger 151 is constructed of a metal such as steel for example.

First Spring Retainer

Referring to FIGS. 7-9 and 34, the first spring retainer 161 is disposed in the first lifter bore 311 and is provided to retain a first end of the first spring 171 thereon. The first spring retainer 161 includes a disk-shaped body 490 having a central aperture 492 extending therethrough and elongated apertures 501, 502, 503 extending therethrough. The central aperture 492 is sized and shaped to receive the shaft 480 of the first pumping plunger 151 therethrough. In an exemplary embodiment, the first spring retainer 161 is constructed of a metal such as steel for example.

First Spring

Referring to FIGS. 7-9, the first spring 171 is disposed in the first lifter bore 311. The first spring 171 is further disposed around the first pumping plunger 151 and contacts the first spring retainer 161. The first spring 171 is further disposed around a barrel portion 532 of the first cylinder head 181 and contacts a ring-shaped member 531 (shown in FIG. 36) of the first cylinder head 181. In an exemplary embodiment, the first spring 171 is constructed of a metal such as steel for example.

First Cylinder Head

Referring to FIGS. 1, 9, 11 and 35-37, the first cylinder head 181 is provided to supply fuel to the common rail 44. The first cylinder head 181 includes an upper tubular portion 520, a central body 530, a ring-shaped member 531, a barrel portion 532, an outlet port 534, the one-way check valve 191 (shown in FIG. 9), a high-pressure release valve 201 (shown in FIG. 11), and the first cap 211. In an exemplary embodiment, the upper tubular portion 520, the central body 530, the ring-shaped member 531, the barrel portion 532, and the outlet port 534 are each constructed of a metal such as steel for example.

The upper tubular portion 520 is integrally formed with the central body 530 and extends in a first direction from a top surface of the central body 530. The upper tubular portion 520 includes a valve chamber 536 (shown in FIG. 37) that holds the one-way check valve 191 therein.

Referring to FIGS. 9, 16 and 35, the central body 530 includes a fuel feed aperture 538 that fluidly communicates with the valve chamber 536 and the first fuel feed aperture 331 (shown in FIG. 9) in the pump housing 130. The fuel feed aperture 538 routes fuel to the one-way check valve 191. The central body 530 includes mounting apertures 541, 542, 543, 544 (shown in FIG. 35) extending therethrough that are aligned with the head bolt holes 371, 372, 373, 374 respectively (shown in FIG. 16), of first head mounting portion 281 of the pump housing 130 which each receive a respective bolt (not shown) therethrough to couple the first cylinder head 181 to the first head mounting portion 281 of the pump housing 130.

Figure 36:
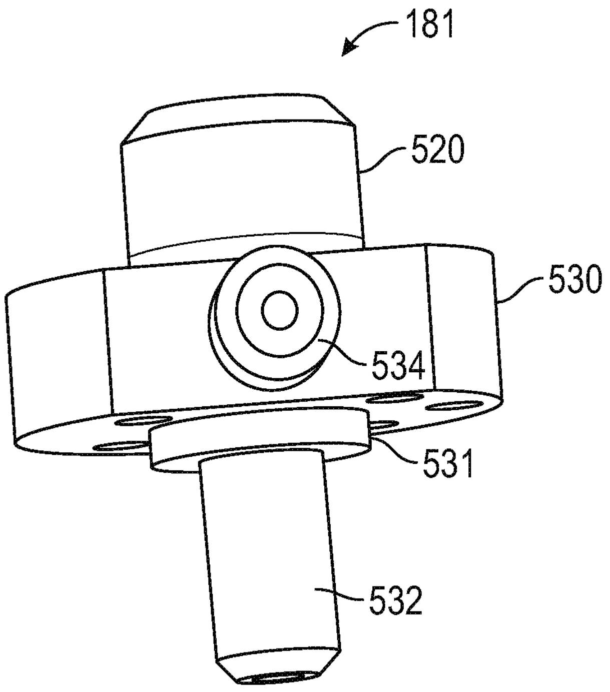
FIG. 36 is another isometric view of the first cylinder head of FIG. 35.

Referring to FIG. 36, the ring-shaped member 531 is integrally formed with the central body 530 and extends in a second direction from a bottom surface of the central body 530.

Figure 11:
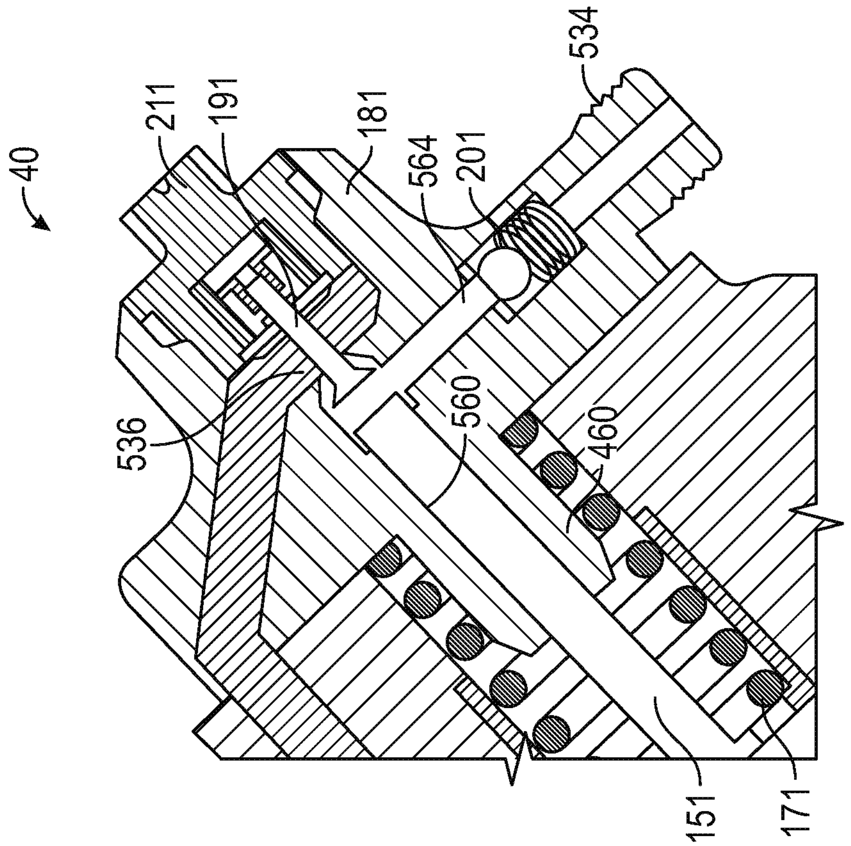
FIG. 11 is a cross-sectional view of a portion of the fuel pump of FIG. 2 taken along lines 11-11 in FIG. 2.

Referring to FIGS. 35 and 36, the barrel portion 532 is integrally formed with ring-shaped member 531 and extends in the second direction from a bottom surface of the ring-shaped member 531. A longitudinal aperture 560 (shown in FIG. 9) extends through the barrel portion 532, the ring-shaped member 531 and a portion of the central body 530. Referring to FIG. 11, the longitudinal aperture 560 fluidly communicates with the valve chamber 536 and an outlet aperture 564 in the outlet port 534. The first spring 171 is disposed around the barrel portion 460, and the shaft 480 of the first pumping plunger 151 is received in the longitudinal aperture 560.

Referring to FIGS. 11 and 35, the outlet port 534 is integrally formed with the central body 530 and extends from a side surface of the central body 530 perpendicular to the barrel portion 532. The outlet port 534 has an outlet aperture 564 extending therethrough. The outlet aperture 564 fluidly communicates with the longitudinal aperture 560. The outlet port 534 is coupled to the high-pressure line 68 (shown in FIG. 1).

Figure 37:
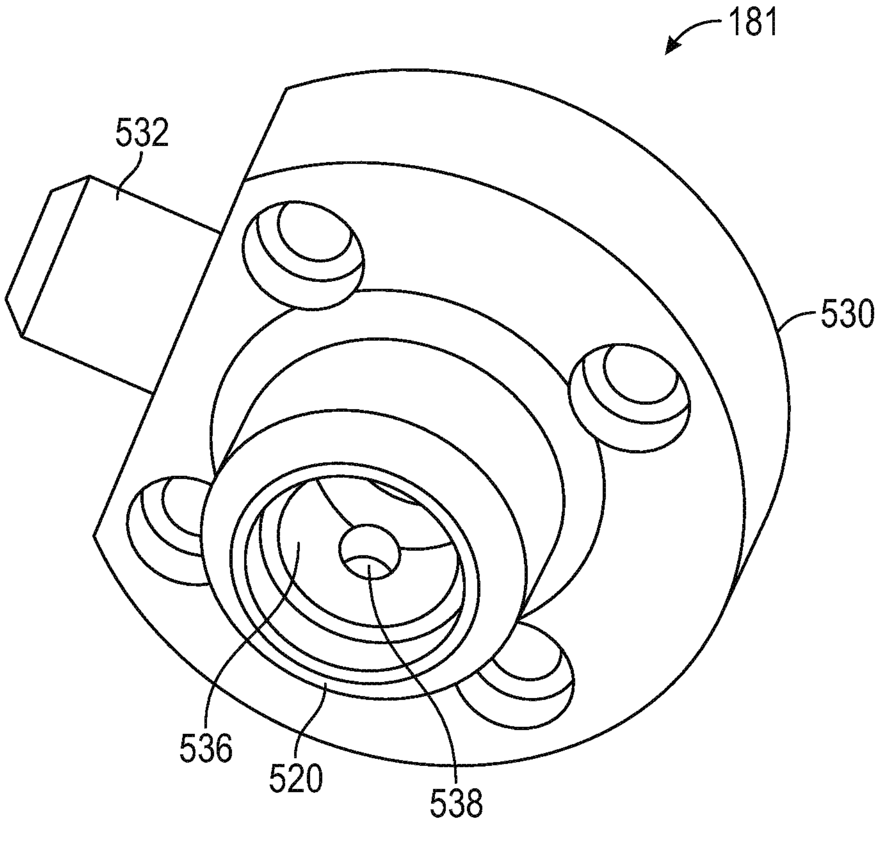
FIG. 37 is another isometric view of the first cylinder head of FIG. 35.

Referring to FIGS. 9, 11 and 37, the one-way check valve 191 is disposed in the valve chamber 536 in the upper tubular portion 520 of first cylinder head 181. The one-way check valve 191 fluidly communicates with the first fuel feed aperture 331 via the fuel feed aperture 538. When the one-way check valve 191 receives fuel from the fuel volume control valve 220 via the first fuel feed aperture, and the first pumping plunger 151 is moving downwardly toward the crankcase chamber 300, the first one-way check valve 191 supplies the fuel to the outlet aperture 564. Alternately, when the first pumping plunger 151 is moving upwardly away from the crankcase chamber 300, the first pumping plunger 151 pumps the fuel through a high-pressure release valve 201 and out of the outlet aperture 564.

Referring to FIG. 11, the high-pressure release valve 201 is disposed in the outlet aperture 564. The high-pressure release valve 201 has an open operational state which allows fuel to pass through the outlet aperture 564 when a pressure level of the fuel in the longitudinal aperture 560 is greater than the threshold pressure level. Further, the high-pressure release valve 201 has a closed open operational state which prevents fuel from passing through the outlet aperture 564 when a pressure level of the fuel in the longitudinal aperture 560 is less than the threshold pressure level.

Figure 2:
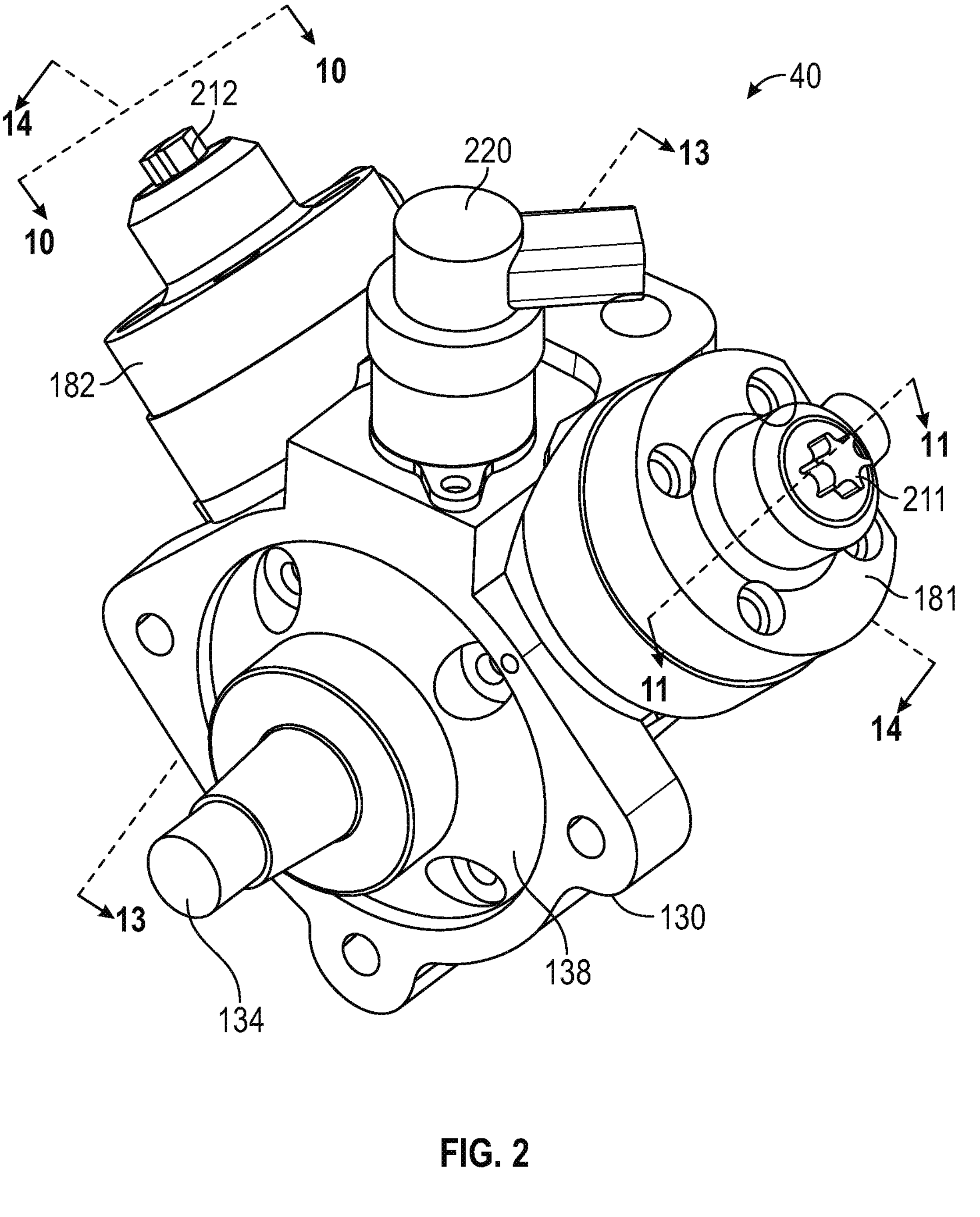
FIG. 2 is an isometric view of the fuel pump of FIG. 1.
Figure 3:
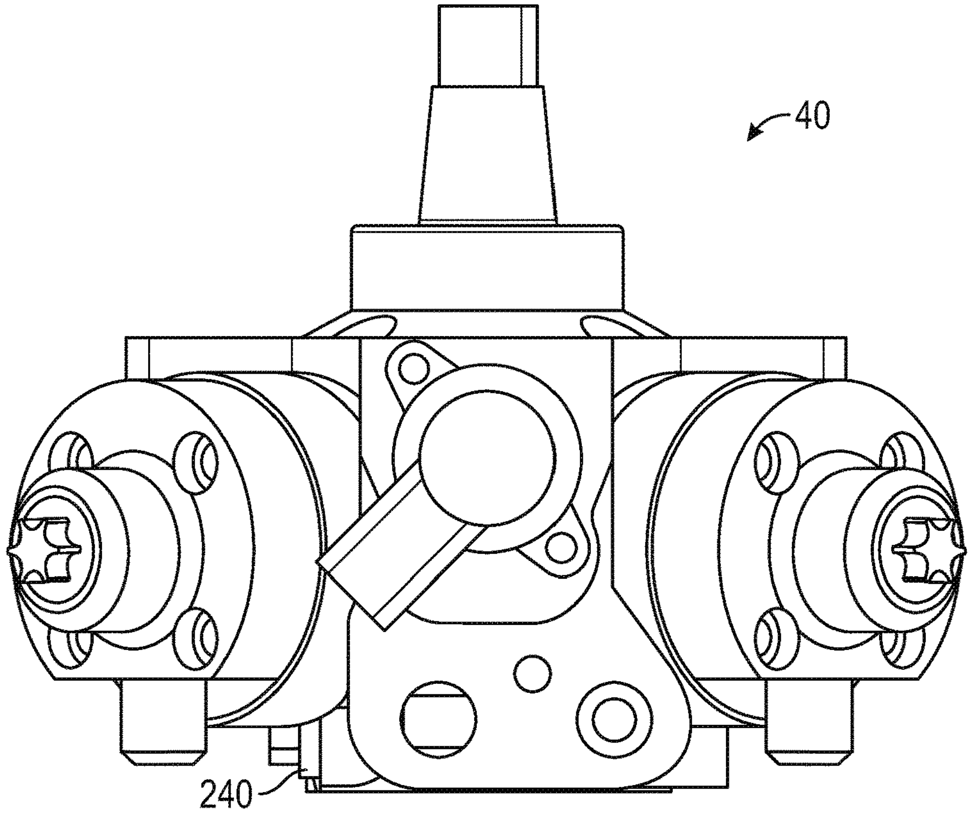
FIG. 3 is a top view of the fuel pump of FIG. 2.
Figure 4:
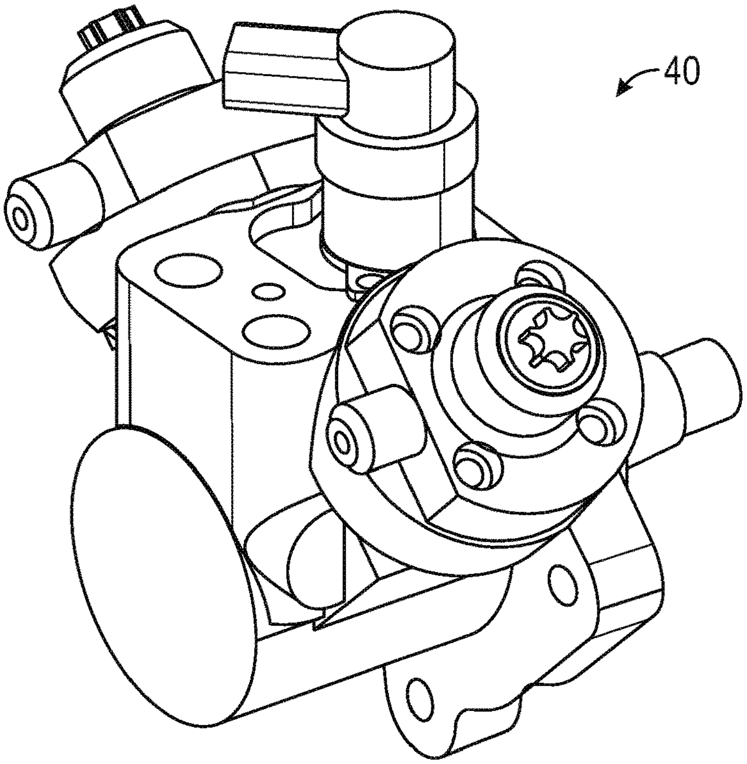
FIG. 4 is another isometric view of the fuel pump of FIG. 2.
Figure 5:
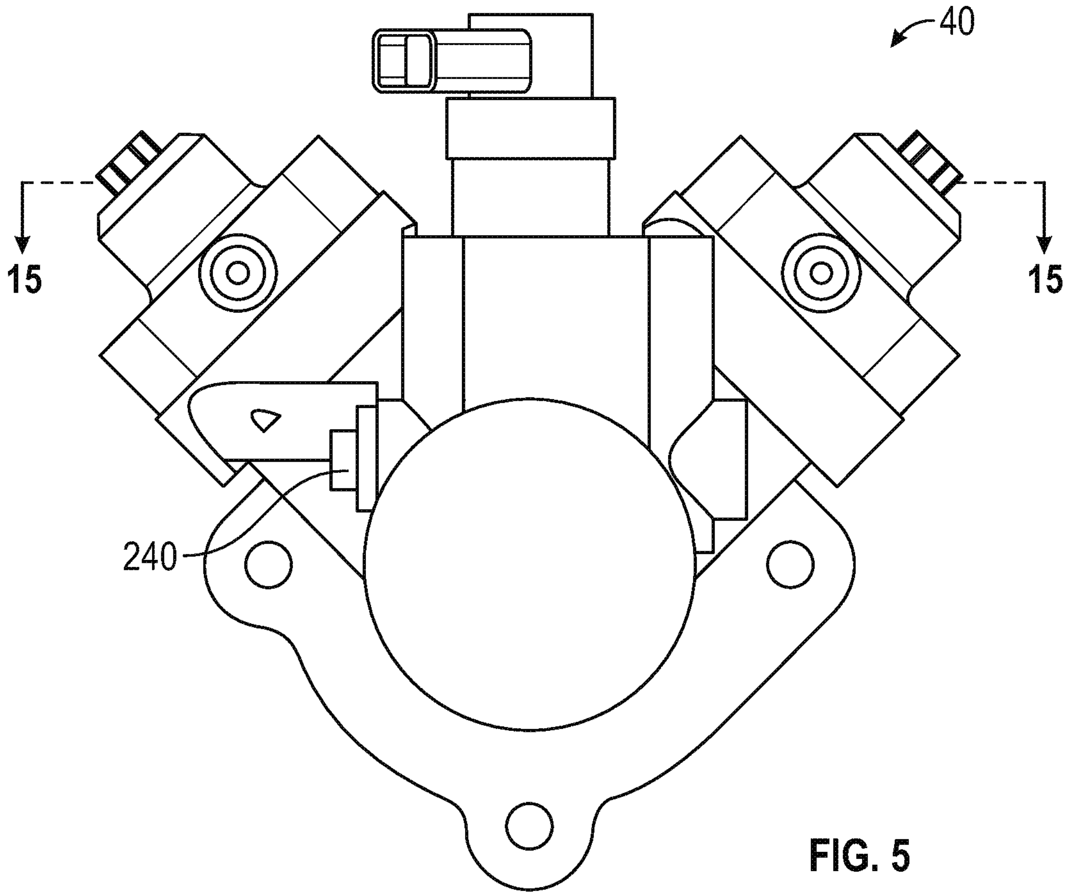
FIG. 5 is a rear view of the fuel pump of FIG. 2.
Figure 6:
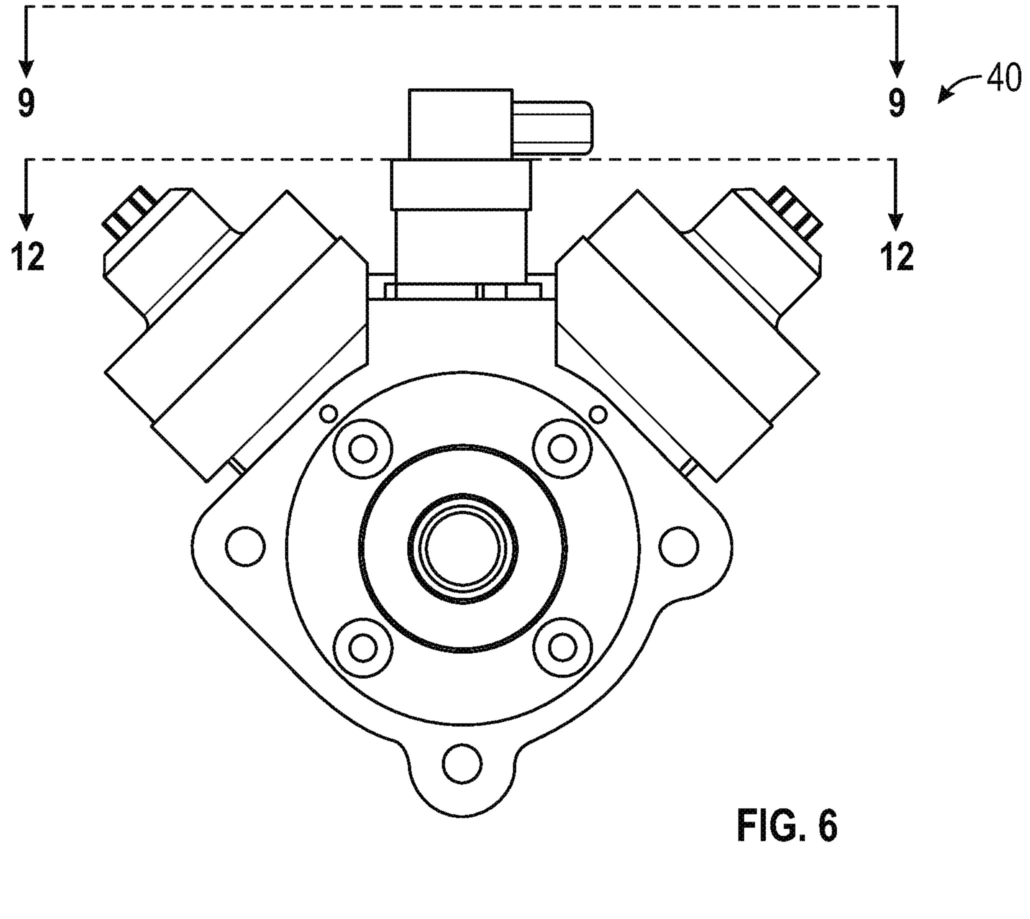
FIG. 6 is a front view of the fuel pump of FIG. 2.

Referring to FIGS. 2 and 11, the first cap 211 is coupled to the upper tubular portion 520 and encloses the valve chamber 536.

Second Roller Lifter

Referring to FIGS. 9 and 12, the second roller lifter 142 has an identical structure as the first roller lifter 141. The second roller lifter 142 is provided to reciprocate the second pumping plunger 152 to pump fuel from the second cylinder head 182 to the high pressure line 70. The second roller lifter 142 is disposed in the second lifter bore 312 and operably contacts the drive cam 422. The second roller lifter 142 includes a barrel portion 660 (shown in FIG. 12) and a roller 662. The barrel portion 660 includes an elongated aperture 664 extending through a wall of the barrel portion 660. The roller 662 operably contacts the drive cam 422. In an exemplary embodiment, the second roller lifter 142 is constructed of a metal such as steel for example.

Second Anti-Rotation Pin

Referring to FIGS. 7, 14, 16, 19, the second anti-rotation pin 222 has an identical structure as the first anti-rotation pin 221. The second anti-rotation pin 222 extends through the second pin aperture 342 and into an elongated aperture 664 of the second roller lifter 142 to prevent rotation of the second roller lifter 142 in the second lifter bore 312. In an exemplary embodiment, the second anti-rotation pin 222 is constructed of a metal such as steel for example.

Second Sealing Ball Bearing

Referring to FIGS. 7, 8 and 16, the sealing ball bearing 232 is disposed in the second pin aperture 342 and contacts the second anti-rotation pin 222. The sealing ball bearing 232 prevents fuel from leaking out of the second pin aperture 342.

Second Pumping Plunger

Referring to FIGS. 7-9, the second pumping plunger 152 has an identical structure as the first pumping plunger 151. The second pumping plunger 152 is provided to pump fuel from the second cylinder head 182. The second pumping plunger 152 includes a shaft 680 and a head 682 coupled to an end of the shaft 680. The second pumping plunger 152 is disposed in the second lifter bore 312 and the head 682 contacts a bottom wall of the second roller lifter 142. The shaft 680 of the second pumping plunger 152 extends through an aperture in the second spring retainer 162 such that the second spring retainer 162 is disposed in the second roller lifter 142. The shaft 680 of the second pumping plunger 152 is received in a longitudinal aperture 760 extending through the barrel portion 732 and a portion of a central body 730 (shown in FIG. 39) of the second cylinder head 182. In an exemplary embodiment, the second pumping plunger 152 is constructed of a metal such as steel for example.

Second Spring Retainer

Referring to FIGS. 7-9, the second spring retainer 162 has an identical structure as the first spring retainer 161. The second spring retainer 162 is disposed in the second lifter bore 312 (shown in FIG. 12) and is provided to retain a first end of the second spring 172 thereon. The second spring retainer 162 has a central aperture extending therethrough that is sized and shaped to receive the shaft 680 of the second pumping plunger 152 therethrough. In an exemplary embodiment, the second spring retainer 162 is constructed of a metal such as steel for example.

Second Spring

The second spring 172 has an identical structure as the first spring 171. The second spring 172 is disposed in the second lifter bore 312. The second spring 172 is further disposed around the second pumping plunger 152 and contacts the second spring retainer 162. The second spring 172 is further disposed around a barrel portion 732 of the second cylinder head 182 and contacts a ring-shaped member 731 (shown in FIG. 39) of the second cylinder head 182. In an exemplary embodiment, the second spring 172 is constructed of a metal such as steel for example.

Second Cylinder Head

Referring to FIGS. 1, 9, 10 and 38-40, the second cylinder head 182 has an identical structure as the first cylinder head 181. The second cylinder head 182 is provided to supply fuel to the common rail 44. The second cylinder head 182 includes upper tubular portion 720, a central body 730, a ring-shaped member 731, a barrel portion 732, an outlet port 734, the one-way check valve 192 (shown in FIG. 9), a high-pressure release valve 202 (shown in FIG. 10), and the second cap 212. In an exemplary embodiment, the upper tubular portion 720, the central body 730, the ring-shaped member 731, the barrel portion 732, and the outlet port 734 are each constructed of a metal such as steel for example.

The upper tubular portion 720 is integrally formed with the central body 730 and extends in a first direction from a top surface of the central body 730. The upper tubular portion 720 includes a valve chamber 736 (shown in FIG. 38) that holds the one-way check valve 192 therein.

Referring to FIGS. 9 and 38-40, the central body 730 includes a fuel feed aperture 738 that fluidly communicates with the valve chamber 736 and the second fuel feed aperture 332 (shown in FIG. 9) in the pump housing 130. The fuel feed aperture 738 routes fuel to the one-way check valve 192. The central body 730 includes mounting apertures 741, 742, 743, 744 extending therethrough that are aligned with the head bolt holes 381, 382, 383, 384 respectively (shown in FIG. 17), of second head mounting portion 282 of the pump housing 130 which each receive a respective bolt (not shown) therethrough to couple the second cylinder head 182 to the second head mounting portion 282 of the pump housing 130.

Figure 39:
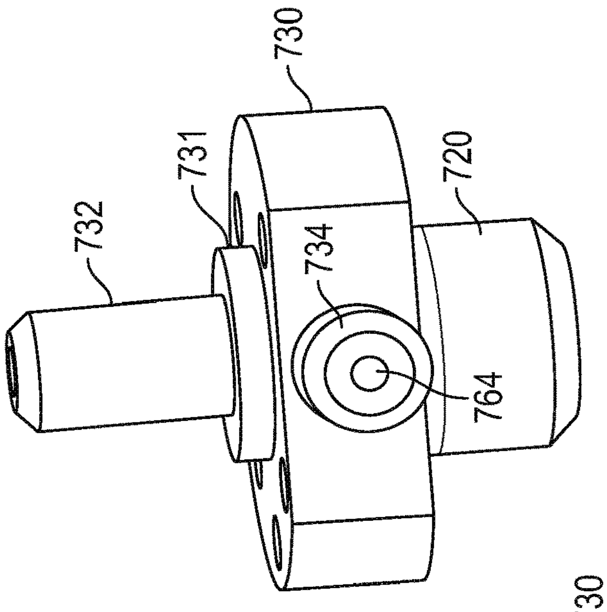
FIG. 39 is another isometric view of the second cylinder head of FIG. 38.
Figure 40:
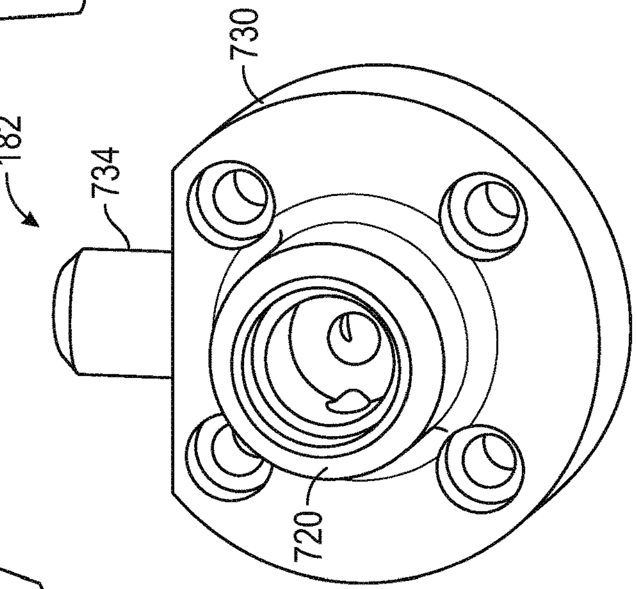
FIG. 40 is another isometric view of the second cylinder head of FIG. 38.

Referring to FIG. 39, the ring-shaped member 731 is integrally formed with the central body 730 and extends in a second direction from a bottom surface of the central body 730.

Figure 10:
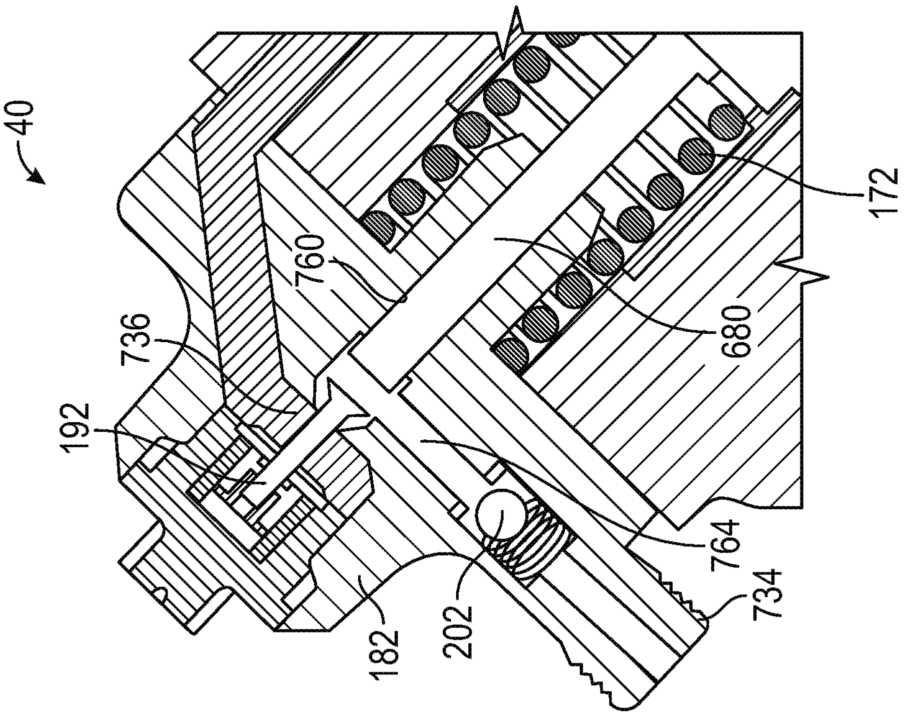
FIG. 10 is a cross-sectional view of a portion of the fuel pump of FIG. 2 taken along lines 10-10 in FIG. 2.

Referring to FIGS. 9 and 39, the barrel portion 732 is integrally formed with ring-shaped member 731 and extends in the second direction from a bottom surface of the ring-shaped member 731. A longitudinal aperture 760 (shown in FIG. 9) extends through the barrel portion 732, the ring-shaped member 731 and a portion of the central body 730. Referring to FIG. 10, the longitudinal aperture 760 fluidly communicates with the valve chamber 736 and an outlet aperture 764 in the outlet port 734. The second spring 172 is disposed around the barrel portion 732, and the shaft 680 of the second pumping plunger 152 is received in the longitudinal aperture 760.

Referring to FIGS. 10 and 38, the outlet port 734 is integrally formed with the central body 730 and extends from a side surface of the central body 730 perpendicular to the barrel portion 732. The outlet port 734 has an outlet aperture 764 extending therethrough. The outlet aperture 764 fluidly communicates with the longitudinal aperture 760. The outlet port 734 is coupled to the high-pressure line 70 (shown in FIG. 1).

Referring to FIGS. 9, 10 and 38, the one-way check valve 192 is disposed in the valve chamber 736 in the upper tubular portion 720 of second cylinder head 182. The one-way check valve 192 fluidly communicates with the second fuel feed aperture 332 (shown in FIG. 9) via the fuel feed aperture 738. When the one-way check valve 192 receives fuel from the fuel volume control valve 220 via the second fuel feed aperture 332, and the second pumping plunger 152 is moving downwardly toward the crankcase chamber 300, the one-way check valve 192 supplies the fuel to the outlet aperture 764. Alternately, when the second pumping plunger 152 is moving upwardly away from the crankcase chamber 300, the second pumping plunger 152 pumps the fuel through a high pressure release valve 202 and out of the outlet aperture 764.

Referring to FIG. 10, the high-pressure release valve 202 is disposed in the outlet aperture 764. The high-pressure release valve 202 has an open operational state which allows fuel to pass through the outlet aperture 764 when a pressure level of the fuel in the longitudinal aperture 760 is greater than the threshold pressure level. Further, the high-pressure release valve 202 has a closed open operational state which prevents fuel from passing through the outlet aperture 764 when a pressure level of the fuel in the longitudinal aperture 760 is less than the threshold pressure level.

Referring to FIGS. 2 and 10, the second cap 212 is coupled to the upper tubular portion 720 and encloses the valve chamber 736.

Fuel Volume Control Valve

Referring to FIGS. 9, 13 and 41, the fuel volume control valve 220 is provided to control the amount of fuel supplied to the first and second cylinder heads 181, 182. The fuel volume control valve 220 is coupled to the top portion 270 of the pump housing 130. The fuel volume control valve 220 is disposed in the control valve chamber 322 and fluidly communicates with the first and second fuel feed apertures 331, 332 which supplies fuel from the fuel bypass aperture 320 which supplies fuel that has not traversed through the crankcase chamber 300.

The fuel volume control valve 220 has a housing 800, a mounting flange 802, an electrical connector 803, and an electrically controlled actuator 804. The mounting flange 802 and the electrical connector 803 are coupled to the housing 800. The electrically controlled actuator 804 is disposed in the housing 800 and is electrically coupled to the electrical connector 803. The housing 800 includes inlet apertures 810, 812 and an outlet aperture 820. The inlet apertures 810, 812 fluidly communicate with the fuel bypass aperture 320. Further, the outlet aperture 820 fluidly communicates with the first and second fuel feed apertures 331, 332 that routes fuel to the first and second cylinder heads 181, 182. The fuel volume control valve 220 receives fuel from the fuel bypass aperture 320 through the inlet apertures 810, 812. The electrically controlled actuator 804 outputs a volume rate of the fuel through the outlet aperture 820 based on a control signal received by the electrical connector 803 from the controller 90 (shown in FIG. 1).

Referring to FIGS. 16 and 41, the mounting flange 820 includes mounting apertures 831, 832 that are aligned with the control valve bolt holes 391, 392 (shown in FIG. 16), respectively, which each receive a respective bolt (not shown) therethrough to couple the fuel volume control valve 220 to the top portion 270 of the pump housing 130.

Referring to FIGS. 9-11 and 13, during operation, the fuel volume control valve 220 receives a first portion of the fuel from the fuel bypass aperture 320 and meters a portion of the first portion of the fuel through the first fuel feed aperture 331 and fuel feed aperture 538 to the one-way check valve 191 in the first cylinder head 181. The one-way check valve 191 supplies the portion of the first portion of the fuel to the first pumping plunger 151 which pumps the portion of the first portion of the fuel through the outlet port 534 of the first cylinder head 181. Further, the fuel volume control valve 220 meters another portion of the first portion of the fuel through the second fuel feed aperture 332 and the fuel feed aperture 738 to the one-way check valve 192 in the second cylinder head 182. The one-way check valve 192 supplies the another portion of the first portion of fuel to the second pumping plunger 152 which pumps the another portion of the first portion of the fuel through the outlet port 734 of the second cylinder head 182.

Overflow Valve

Figure 42:
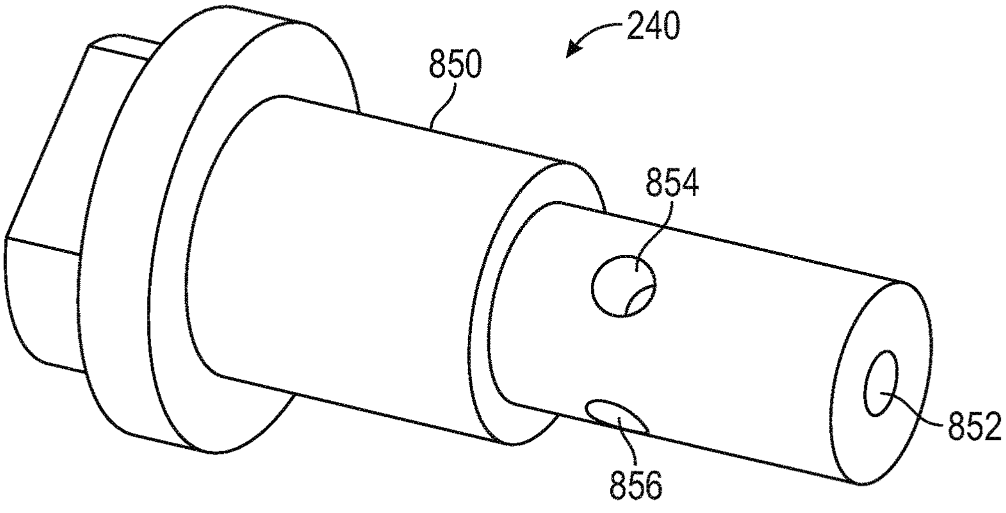
FIG. 42 is an isometric view of an overflow valve utilized in the fuel pump of FIG. 2.

Referring to FIGS. 13, 15 and 42, the overflow valve 240 is provided to route fuel from the crankcase chamber 300 to the fuel outlet aperture 304 and the fuel return line 82 (shown in FIG. 1) when a pressure level in the crankcase chamber 300 is greater than a threshold pressure level. The connecting aperture 305 fluidly connects the crankcase chamber 300 to the overflow aperture 350. Further, the overflow aperture 350 fluidly communicates with the fuel outlet aperture 304. The overflow valve 240 is disposed in the overflow aperture 350.

The overflow valve 240 includes a housing 850 having an inlet aperture 852 and outlet apertures 854, 856. The inlet aperture 852 fluidly communicates with the connecting aperture 305 (shown in FIG. 15). Further, the outlet apertures 854, 856 fluidly communicate with the fuel outlet aperture 304 (shown in FIG. 15).

During operation, when a pressure level of fuel in the crankcase chamber 300 is greater than a threshold pressure level, the overflow valve 240 routes fuel from the crankcase chamber 300 through the inlet aperture 852 and out of the outlet apertures 854, 856 to the fuel outlet aperture 304. The fuel then is routed through the fuel return line 82 to the fuel tank 30.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A fuel pump, comprising:

a pump housing having a first lifter bore, a fuel inlet aperture, a fuel bypass aperture, and a crankcase chamber, the first lifter bore communicating with the crankcase chamber;

a first roller lifter being disposed in the first lifter bore; the first roller lifter being operably coupled to a first pumping plunger;

a camshaft having a drive cam disposed in the crankcase chamber, the drive cam contacting the first roller lifter, the camshaft being rotatable by an exterior motive force so as to rotate the drive cam to thereby reciprocate the first roller lifter within the first lifter bore;

the fuel inlet aperture extending through a portion of the pump housing to the crankcase chamber and being adapted to receive fuel therethrough;

the fuel bypass aperture communicating with the fuel inlet aperture above the crankcase chamber;

the fuel inlet aperture supplying a first portion of the fuel which has not traversed through the crankcase chamber after entering the fuel inlet aperture to the fuel bypass aperture, the fuel bypass aperture routing the first portion of the fuel to a fuel volume control valve, the fuel volume control valve supplying a portion of the first portion of the fuel to the first pumping plunger;

the pump housing having a first pin aperture extending through the pump housing to the first lifter bore; and a first anti-rotation pin extending through the first pin aperture and into an elongated aperture of the first roller lifter to prevent rotation of the first roller lifter.

2. The fuel pump of claim 1, wherein:

the pump housing further having a second lifter bore, the second lifter bore communicating with the crankcase chamber;

a second roller lifter being disposed in the second lifter bore; the second roller lifter being operably coupled to a second pumping plunger;

the camshaft being rotatable by the exterior motive force so as to rotate the drive cam to thereby reciprocate the second roller lifter within the second lifter bore;

the fuel volume control valve supplying another portion of the first portion of the fuel to the second pumping plunger;

the pump housing having a second pin aperture extending through the pump housing to the second lifter bore; and a second anti-rotation pin extending through the second pin aperture and into an elongated aperture of the second roller lifter to prevent rotation of the second roller lifter.

3. The fuel pump of claim 2, wherein:

the pump housing further having a control valve chamber and first and second fuel feed apertures; the fuel volume control valve being disposed in the control valve chamber;

the fuel bypass aperture communicating with and extending between the fuel inlet aperture and the control valve chamber; and the fuel volume control valve communicating with the first and second fuel feed apertures.

4. The fuel pump of claim 3, wherein:

the fuel volume control valve receiving the first portion of the fuel from the fuel bypass aperture and metering the portion of the first portion of the fuel through the first fuel feed aperture to the first pumping plunger which pumps the portion of the first portion of the fuel from a first cylinder head, the fuel volume control valve metering the another portion of the first portion of the fuel through the second fuel feed aperture to the second pumping plunger which pumps the another portion of the first portion of the fuel from a second cylinder head.

5. The fuel pump of claim 4, further comprising:

a first spring retainer and a first spring;

the first pumping plunger being disposed in the first lifter bore and contacting the first roller lifter, the first pumping plunger extending through an aperture in the first spring retainer such that the first spring retainer is disposed in the first roller lifter;

the first spring being disposed around the first pumping plunger and contacting the first spring retainer;

the first cylinder head having a first central body, a first barrel portion, a first outlet port, a first upper tubular portion, and a first one-way check valve; the first one-way check valve being disposed in the first upper tubular portion and communicating with the first fuel feed aperture, a first longitudinal aperture extending through the first barrel portion and a portion of the first central body, the first outlet port having a first outlet aperture communicating with the first longitudinal aperture;

the first spring being further disposed around the first barrel portion and contacting the first cylinder head; and the first pumping plunger being received in the first longitudinal aperture.

6. The fuel pump of claim 5, wherein:

when the first one-way check valve receives the portion of the first portion of fuel from the first fuel feed aperture and the first pumping plunger is moving downwardly toward the crankcase chamber, the first one-way check valve supplies the portion of the first portion of fuel to the first outlet aperture; and when the first pumping plunger is moving upwardly away from the crankcase chamber, the first pumping plunger pumps the portion of the first portion of fuel through the first outlet aperture of the first outlet port.

7. The fuel pump of claim 6, further comprising:

a second spring retainer and a second spring;

the second roller lifter being disposed in the second lifter bore and operably contacting the drive cam;

the second pumping plunger being disposed in the second lifter bore and contacting the second roller lifter, the second pumping plunger extending through an aperture in the second spring retainer such that the second spring retainer is disposed in the second roller lifter;

the second spring being disposed around the second pumping plunger and contacting the second spring retainer;

the second cylinder head having a second central body, a second barrel portion, a second outlet port, a second upper tubular portion, and a second one-way check valve; the second one-way check valve being disposed in the second upper tubular portion and communicating with the second fuel feed aperture, a second longitudinal aperture extending through the second barrel portion and a portion of the second central body, the second outlet port having a second outlet aperture communicating with the second longitudinal aperture;

the second spring being further disposed around the second barrel portion and contacting the second cylinder head; and the second pumping plunger being received into the second longitudinal aperture.

8. The fuel pump of claim 7, wherein:

when the second one-way check valve receives the another portion of the first portion of fuel from the second fuel feed aperture and the second pumping plunger is moving downwardly toward the crankcase chamber, the second one-way check valve supplies the another portion of the first portion of fuel to the second outlet aperture; and when the second pumping plunger is moving upwardly away from the crankcase chamber, the second pumping plunger pumps the another portion of the first portion of fuel through the second outlet aperture of the second outlet port.

9. The fuel pump of claim 1, wherein:

the fuel inlet aperture routing a second portion of the fuel to the crankcase chamber for lubricating the drive cam;

a fuel outlet aperture extending into the pump housing; and an overflow valve fluidly communicating with the crankcase chamber and the fuel outlet aperture such that the overflow valve supplies the second portion of the fuel from the crankcase chamber to the fuel outlet aperture when a pressure level in the crankcase chamber is greater than a threshold pressure level.

* * * * *